(12) United States Patent
Ryu et al.

(10) Patent No.: US 10,753,675 B2
(45) Date of Patent: Aug. 25, 2020

(54) REFRIGERATOR AND METHOD OF CONTROLLING THE SAME

(71) Applicant: Samsung Electronics Co., Ltd, Suwon-si, Gyeonggi-do (KR)

(72) Inventors: Dong Nyeol Ryu, Suwon-si (KR); Kook Jeong Seo, Seoul (KR); Sung In Park, Yongin-si (KR); Pyeong Ki Park, Suwon-si (KR); Hyo Jin Yoon, Suwon-si (KR); Hyung Gwan Je, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 15/418,629

(22) Filed: Jan. 27, 2017

(65) Prior Publication Data

US 2017/0219277 A1 Aug. 3, 2017

(30) Foreign Application Priority Data

Jan. 29, 2016 (KR) ........................ 10-2016-0011539

(51) Int. Cl.
*F25D 29/00* (2006.01)
*F25B 49/02* (2006.01)
*F04D 27/00* (2006.01)

(52) U.S. Cl.
CPC ........... *F25D 29/00* (2013.01); *F04D 27/004* (2013.01); *F25B 49/025* (2013.01); *F25B 2600/021* (2013.01); *F25B 2600/23* (2013.01); *F25D 2500/04* (2013.01); *F25D 2600/02* (2013.01); *F25D 2600/04* (2013.01); *F25D 2700/12* (2013.01); *F25D 2700/14* (2013.01); *Y02B 30/741* (2013.01)

(58) Field of Classification Search
CPC .. F25D 29/00; F25D 2700/14; F25D 2600/04; F25B 49/025; F25B 2600/23; F25B 2600/021

See application file for complete search history.

(56) References Cited

U.S. PATENT DOCUMENTS 5,548,969 A 8/1996 Lee
2007/0113569 A1 5/2007 Oh et al.

FOREIGN PATENT DOCUMENTS

| JP | 2008057905 A | 3/2008 |
| JP | 2011169520 A * | 9/2011 |
| JP | 2013011219 A * | 1/2013 |

(Continued)

OTHER PUBLICATIONS

Ahn et al., Inverter Compressor for Refrigerator . . . , Aug. 19, 2015, KR20150094288A, Whole Document (Year: 2015).*

(Continued)

*Primary Examiner* — Larry L Furdge

(57) ABSTRACT

Embodiments of the present disclosure relate to refrigerators and methods of controlling the refrigerators. The refrigerator comprises a compressor configured to operate at a first rotation speed and a controller configured to calculate a first average of levels of electric signals input to the compressor during a first reference period, and control the compressor to operate at a second rotation speed higher than the first rotation speed when the first average is greater than a first reference value.

15 Claims, 34 Drawing Sheets

(56) References Cited

FOREIGN PATENT DOCUMENTS

| JP | 2014234718 |   | 12/2014 |
|----|------------|---|---------|
| JP | 2015098960 A | * | 5/2015 |
| KR | 1020130004678 |   | 1/2013 |
| KR | 1020150074247 |   | 7/2015 |
| KR | 20150094288 A | * | 8/2015 |
| KR | 1020150094288 |   | 8/2015 |

OTHER PUBLICATIONS

Endo, Control Device for Compressor, Jan. 17, 2013, JP2013011219A, Whole Document (Year: 2013).*

Sugawara, Compressor Motor Control Device for Refrigerating Machine, May 28, 2015, JP2015098960A, Whole Document (Year: 2015).*

Yokoyama, Air Conditioner, Sep. 1, 2011, JP2011169520A, Whole Document (Year: 2011).*

Intellectual Property India, "Examination report under sections 12 & 13 of the Patents Act, 1970 and the Patents Rules, 2003," Application No. IN 201724001364, dated Jul. 29, 2019, 6 pages.

* cited by examiner

FIG.7B

| INDEX | $K_{TH}$ ROTATION SPEED | $K_{TH}$ REFERENCE VALUE | $K_{TH}$ REFERENCE PERIOD | $K_H$ LIMIT PERIOD |
|---|---|---|---|---|
| #1 | 1400 rpm | 44.5W | 5 min | 30 min |
| #2 | 2000 rpm | 56W | 40 min | 30 min |
| #3 | 2600 rpm | 67W | 10 min | 30 min |
| #4 | 3200 rpm | N/A | N/A | N/A |

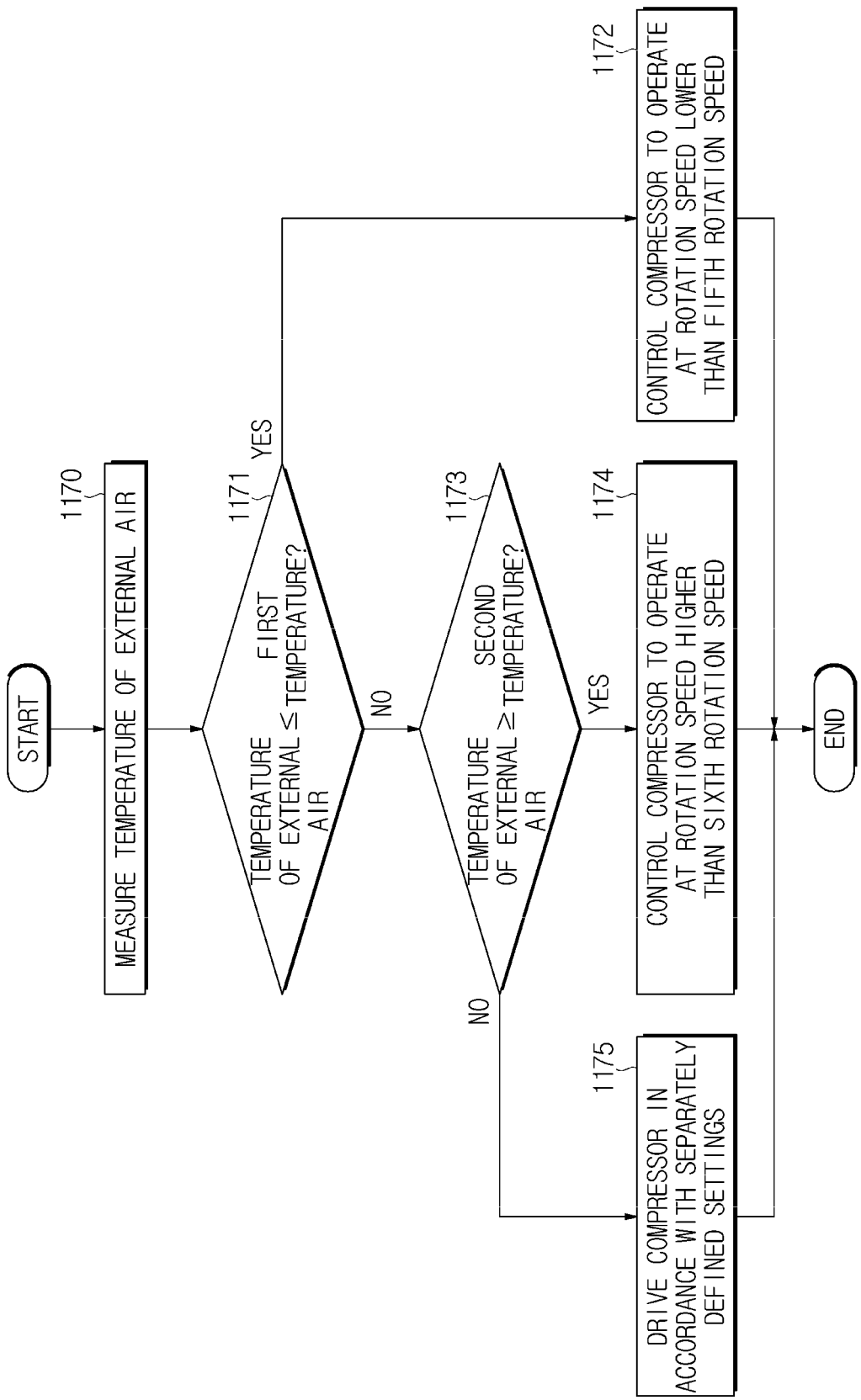

REFRIGERATOR AND METHOD OF CONTROLLING THE SAME

CROSS-REFERENCE TO RELATED APPLICATION(S) AND CLAIM OF PRIORITY

This application claims the benefit of Korean Patent Application No. 10-2016-0011539, filed on Jan. 29, 2016 in the Korean Intellectual Property Office, the disclosure of which is incorporated herein by reference.

TECHNICAL FIELD

Embodiments of the present disclosure relate to refrigerators and methods of controlling the refrigerators.

BACKGROUND

Refrigerators have been widely used to store objects to be kept fresh such as food or drugs at or below a predetermined temperature in households and in industry and commerce. A refrigerator includes a storage compartment to store objects and a cooling device configured to maintain the storage compartment at or below a predetermined temperature by supplying cool air into the storage compartment, allowing the objects in a chilled or frozen state at or below the predetermined temperature.

The storage compartment of the refrigerator may include a refrigerator compartment, a freezer compartment, and/or a temperature-variable compartment. The refrigerator compartment stores objects in a chilled state by maintaining the inside thereof at or below a predetermined temperature, and the freezer compartment stores objects in a frozen state by maintaining the inside thereof at or below a temperature lower than that of the refrigerator compartment. The temperature-variable compartment may store or preserve various types of objects at different temperatures in accordance with properties thereof by changing an internal temperature thereof in accordance with the types or properties of the objects.

A refrigerator may maintain the insides of a storage compartment at or below a predetermined temperature desired by a user by repeating evaporation and compression of a refrigerant. A refrigerator may include an evaporator, a compressor, a condenser, and an expansion valve to repeatedly perform evaporation and compression of the refrigerant.

In this case, a fixed speed compressor or an inverter compressor may be used as the compressor of the refrigerator. The fixed speed compressor refers to a compressor in which revolutions per minute (RPM) is fixed, and the inverter compressor refers to a compressor in which the RPM is variable. The fixed speed compressor sucks and compresses cool air at a constant RPM. The inverter compressor sucks and compresses cool air at a varying RPM.

SUMMARY

Therefore, it is an aspect of the present disclosure to provide a refrigerator in which an RPM varies based on an input value of an electric signal applied to a compressor, and a method of controlling the refrigerator.

It is another aspect of the present disclosure to provide a refrigerator in which an RPM of a compressor is controlled without using a sensor configured to sense an internal temperature of a storage compartment and/or a sensor configured to sense a temperature of external air, and a method of controlling the refrigerator.

Additional aspects of the disclosure will be set forth in part in the description which follows and, in part, will be obvious from the description, or may be learned by practice of the disclosure.

A refrigerator may comprise a compressor configured to operate at a first rotation speed and a controller configured to calculate a first average of levels of electric signals input to the compressor during a first reference period, and control the compressor to operate at a second rotation speed higher than the first rotation speed when the first average is greater than a first reference value.

The controller may control the compressor to continuously operate at the first rotation speed when the first average is less than the first reference value.

The controller may control the compressor to operate at a third rotation speed higher than the second rotation speed when the compressor rotates at the first rotation speed for a first limit period or longer.

The controller may calculate a second average of levels of electric signals input to the compressor during a second reference period after the compressor starts operation at the second rotation speed and controls the compressor to operate at a third rotation speed higher than the second rotation speed when the second average is greater than a second reference value.

The controller may control the compressor to operate at a fourth rotation speed higher than the second rotation speed when the compressor rotates at the second rotation speed for a second limit period or longer.

The second limit period may be shorter than the second reference period.

The controller may calculate an average of levels of the electric signals input during the second limit period, calculates a second average of levels of the electric signals input during the second reference period when the average during the second limit period is greater than the second reference value, and controls the compressor to operate at the third rotation speed higher than the second rotation speed when the second average is greater than the second reference value.

The controller may control the compressor to operate at the fourth rotation speed higher than the second and third rotation speeds when the average during the second limit period is less than the second reference value.

The controller may control the compressor to operate at the second rotation speed when the second average is less than the second reference value.

The controller may calculate a third average of levels of the electric signals input to the compressor during a third reference period after the compressor starts operation at the third rotation speed, and controls the compressor to operate at the fourth rotation speed higher than the third rotation speed when the third average is greater than a third reference value.

The controller may control the compressor to operate at the fourth rotation speed higher than the third rotation speed when the third average is less than the third reference value and the compressor operates at the third rotation speed for a third limit period or longer.

The controller may control the compressor to operate at the fourth rotation speed when the compressor operates for a fourth limit period or longer after the compressor starts operation.

At least two of the first reference period, the second reference period, and the third reference period may be different.

The second reference value may be greater than the first reference value, and the third reference value is greater than the second reference value.

The compressor may start operation based on at least one of a temperature of a storage compartment and an elapse of time from operation stop of the compressor.

The compressor may start operation based on at least one of the temperature of the storage compartment and the elapse of time from operation stop of the compressor after a predetermined delay time.

The compressor may stop operation by at least one of a temperature of a storage compartment and a driving period of the compressor.

The controller may control the compressor to operate at a rotation speed lower than a fifth rotation speed when a temperature of external air is lower than a predefined temperature.

The controller may control the compressor at a rotation speed higher than a sixth rotation speed when a temperature of external air is higher than a predefined temperature.

A method of controlling a refrigerator may comprises driving a compressor at a first rotation speed, calculating a first average of levels of electric signals input to the compressor during a first reference period and driving the compressor at a second rotation speed higher than the first rotation speed when the first average is greater than a first reference value.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7B is a table exemplarily illustrating rotation speeds, reference values, reference periods, and limit periods.

FIG. 33 is a flowchart for describing a method of controlling a refrigerator according to another embodiment.

DETAILED DESCRIPTION

Figure 1:
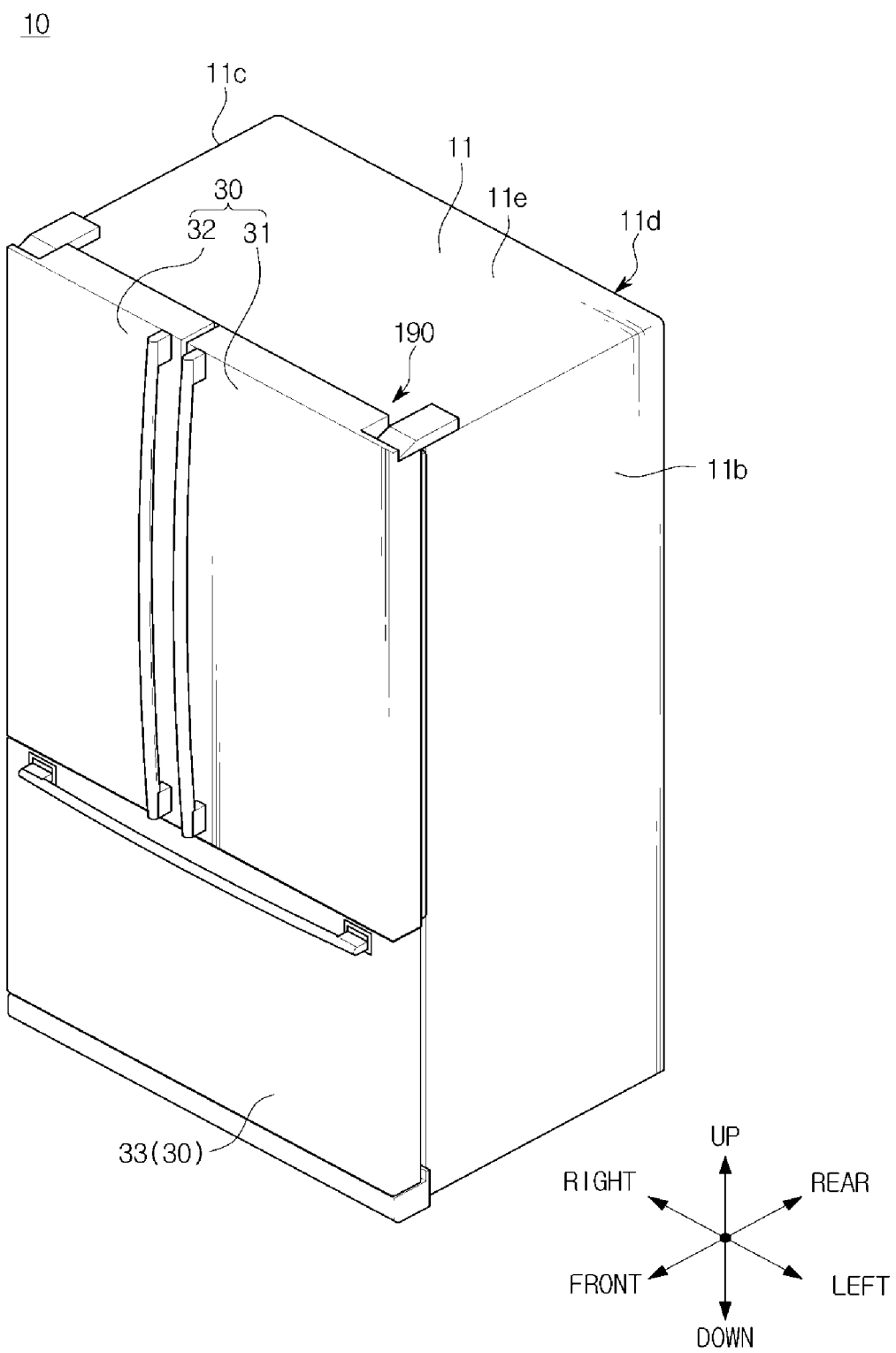
FIG. 1 is an external view of a refrigerator according to an embodiment.

Reference will now be made in detail to the embodiments of the present disclosure, examples of which are illustrated in the accompanying drawings, wherein like reference numerals refer to like elements throughout.

Hereinafter, a refrigerator according to an embodiment will be described with reference to FIGS. 1 to 33.

Figure 2:
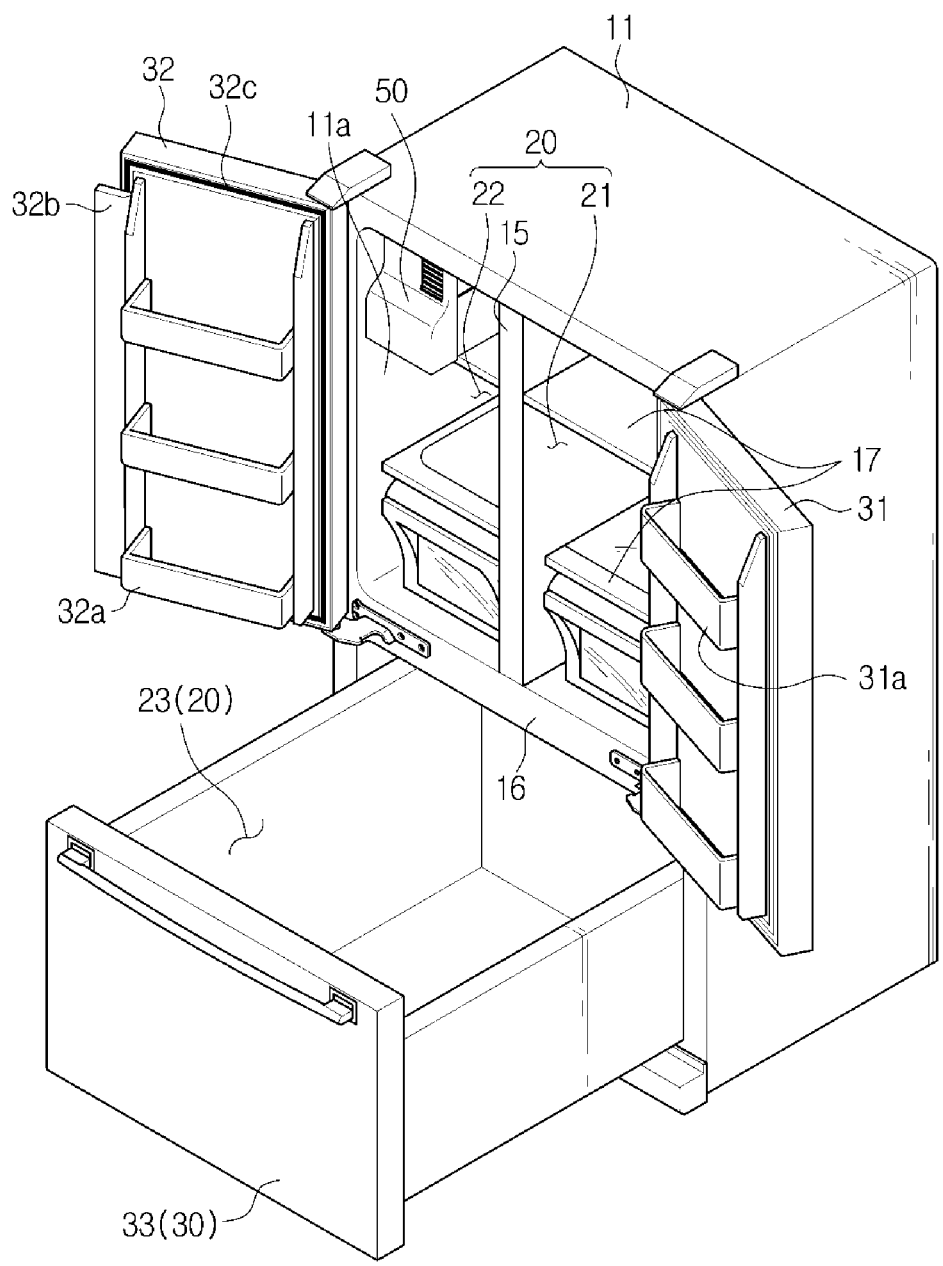
FIG. 2 is an internal view of the refrigerator when doors are opened.

FIG. 1 is an external view of a refrigerator according to an embodiment. FIG. 2 is an internal view of the refrigerator when doors are opened. In FIGS. 1 and 2, a direction toward a door 30 of a refrigerator 10 is referred to as forward direction, and the opposite direction is referred to as backward direction. Also, a direction toward a bottom surface of the refrigerator 10 is referred to as downward direction, and the opposite direction is referred to as upward direction. Directions perpendicular to both the forward-backward directions and upward-downward directions are referred to as left and right directions. However, these terms are defined for descriptive convenience and may also be defined in various manners by a designer.

Referring to FIGS. 1 and 2, the refrigerator 10 may include a housing 11 defining an appearance of the refrigerator 10 and a door 30 disposed at one surface of the housing 11.

The housing 11 has an open front 11a and the other surfaces 11b to 11e thereof are closed. A storage compartment 20 and various parts required to cool the storage compartment 20 are installed in the housing 11.

At least one door 30 is coupled to the housing 11 to open and close the open front 11a of the housing 11. The storage compartment 20 of the housing 11 may be exposed by opening the door 30. According to an embodiment, the door 30 may be rotatably coupled to the housing 11 via a hinge disposed at one side of the open front 11a of the housing 11 to open and close the open front 11a. According to another embodiment, a door 33 may be installed at the housing 11 to slidably move into and out of the housing 11 via rails or wheels (not shown) installed in the housing 11.

When a plurality of doors 31 to 33 are installed, the doors 31 to 33 may each independently be opened or closed. If the doors 31 to 33 are opened, storage compartments 21 to 23 respectively corresponding to the doors 31 to 33 may be exposed to the outside. For example, when a first door 31 is rotated about a hinge axis, a first storage compartment 21 disposed at a position corresponding to the first door 31 may be exposed to the outside. By opening the doors 31 to 33, a user may put objects to be stored in each of the storage compartments 21 to 23 through the open front 11a of the housing 11 to accommodate and store the objects.

According to an embodiment, a user interface 400 (FIG. 4) configured to receive various input commands related to operation of the refrigerator 10 or provide various information related to the operation of the refrigerator 10 to the user may be installed at the door 30. The user interface 400 may be disposed at various positions of the door 30 selected by a designer.

The user interface 400 may include an input unit to receive an input command of the user and an output unit to provide various information to the user.

Also, the door 30 may be provided with a dispenser to provide water, soda water, or ice. For example, the dispenser may provide the user with water purified by a water purifier or ice cubes made using an ice making apparatus 50.

According to an embodiment, the doors 31 and 32 may be provided with door guards 31a and 32a to accommodate various objects at rear sides thereof. The doors 31 and 32 may also be provided with gaskets 32c, which seals gaps between the housing and the doors 31 and 32 when the doors 31 and 32 are closed, along boundaries of the rear sides thereof to prevent leakage of cool air of the storage compartment 20. At least one of the doors 31 and 32 may also be provided with a rotation bar 32b, which seals a gap between the first door 31 and a second door 32 to prevent leakage of cool air of the storage compartment 20 when the doors 31 and 32 are closed.

The housing 11 may include frames 15 and 16 configured to partition an inner space, and the storage compartments 21 and 23 are defined by the frames 15 and 16 and the housing 11. The frames 15 and 16 are formed of a material having low thermal conductivity to prevent heat transfer between cool airs from one of storage compartments 21 to 23 to another. The storage compartments 21 to 23 may store the accommodated objects at or below predetermined temperatures, respectively. In this case, the storage compartments 21 to 23 may be a refrigerator compartment, a temperature-variable compartment, or a freezer compartment in accordance with set temperatures. Each of the storage compartments 21 to 23 may have an inlet hole installed at one or more walls through which cool air is introduced. Cool air 28 generated in a heat exchanger is introduced into the storage compartments 21 to 23 by fans. The storage compartment 20 may be provided with shelves 17 having various shapes to hold the objects to be stored. Also, various other devices such as storage boxes may also be installed in the storage compartment 20 for user convenience.

The storage compartment 20 may also include a storage compartment temperature sensing unit 180 (FIG. 4) to sense a temperature of the storage compartment 20. If a plurality of storage compartments 21 to 23 are provided, the storage compartment temperature sensing unit 180 may be installed in each of the storage compartments 21 to 23.

According to an embodiment, the storage compartment temperature sensing unit 180 may be implemented using a temperature sensor configured to sense temperature by using changes in electrical resistance, a temperature sensor configured to sense temperature by using a diode or transistor, or a temperature sensor configured to sense temperature by using pyroelectric effects. Besides, various other types of temperature sensors may also be used therefor.

According to another embodiment, the storage compartment temperature sensing unit 180 may be implemented using a thermostat 181 (FIG. 6) configured to open or close a switch in accordance with operation of a bi-metal including two alloy plates having different coefficients of expansion. The thermostat 181 is electrically connected to a compressor controller 200 and/or a compressor 110 via a circuit and bends depending on an internal temperature of the storage compartment 20 to connect the circuit to transmit an electric signal to the compressor controller 200 and/or the compressor 110.

According to an embodiment, an external air temperature sensing unit 190 to sense temperature of ambient air of the refrigerator 10 may be installed at an outer surface of the housing 11 of the refrigerator 10. However, if the compressor controller 200 controls operation of the compressor 110, which will be described later, the external air temperature sensing unit 190 may be dispensed with. The external air temperature sensing unit 190 will be described in more detail later.

Figure 3:
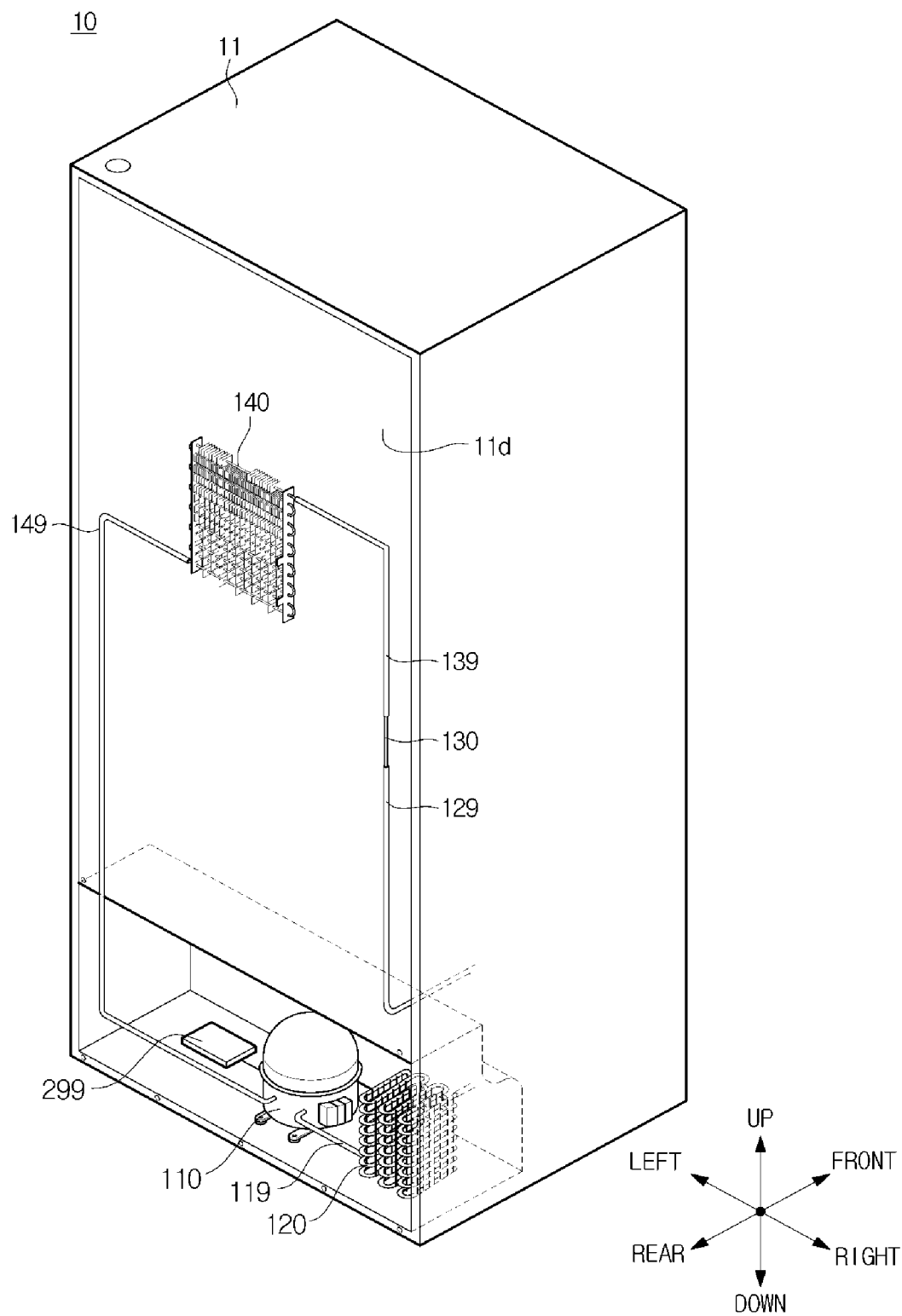
FIG. 3 is a view illustrating an inner structure of the refrigerator.
Figure 4:
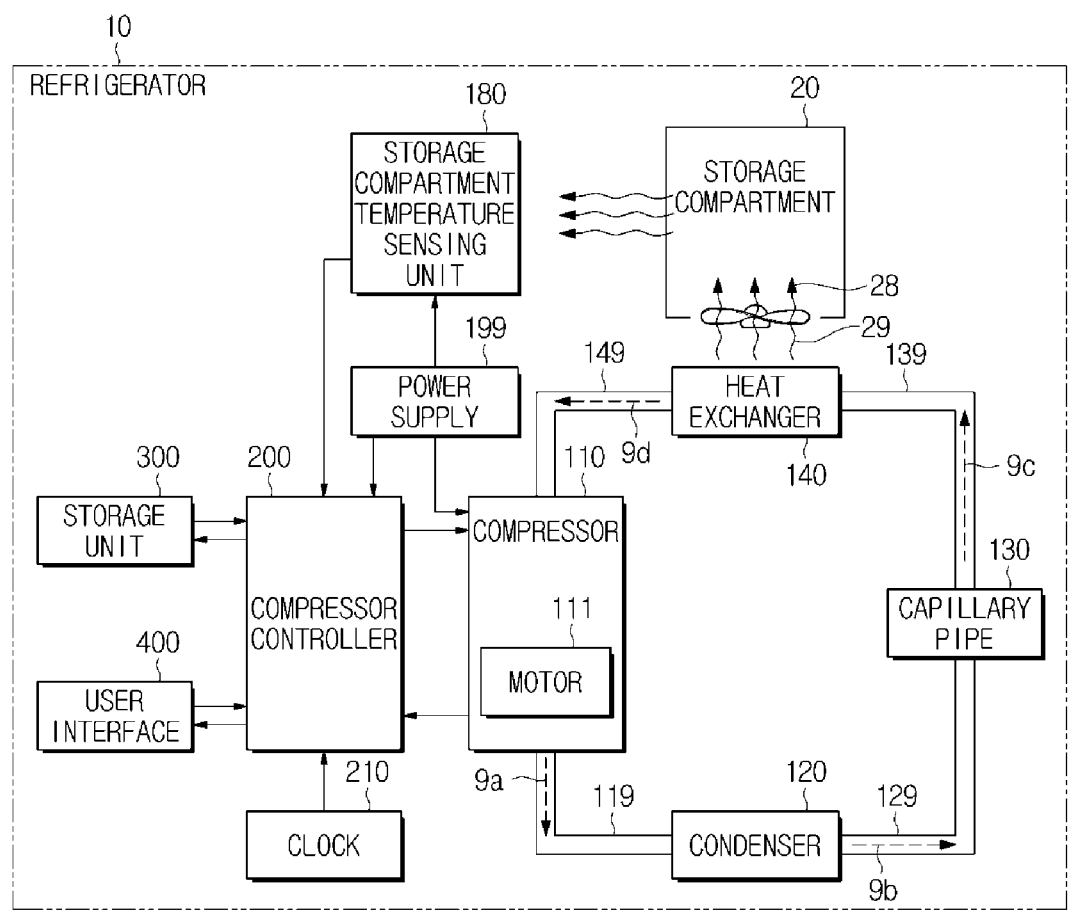
FIG. 4 is a control block diagram illustrating a control flow of the refrigerator.

FIG. 3 is a view illustrating an inner structure of the refrigerator. FIG. 4 is a control block diagram illustrating a control flow of the refrigerator. Arrows shown in refrigerant channels 119, 129, 139, and 149 of FIG. 4 indicate flow directions of a refrigerant 9a to 9d during a cooling cycle in the refrigerator 10.

Referring to FIGS. 3 and 4, the refrigerator 10 may include a compressor 110, a condenser 120, a capillary pipe 130, a heat exchanger 140, and refrigerant channels 119, 129, 139, and 149 connecting the compressor 110, the condenser 120, the capillary pipe 130, and the heat exchanger 140. The compressor 110, the condenser 120, the capillary pipe 130, the heat exchanger 140, and the refrigerant channels 119, 129, 139, and 149 are fixedly disposed at an outer and/or inner portion of the housing 11 of the refrigerator 10.

The compressor 110, which may be installed at a lower portion of a rear surface 11d of the refrigerator 10, receives the refrigerant 9d from a compressor refrigerant inlet 149, compresses the refrigerant 9*d*, and discharges the compressed refrigerant 9*a* to the condenser 120 via a condenser refrigerant inlet 119.

The refrigerant 9*d* introduced into the compressor 110 through the compressor refrigerant inlet 149 may be Freon (chlorofluorocarbon, CFC), hydrochlorofluorocarbon (HCFC), hydrofluorocarbon (HFC), or the like. However, the refrigerant is not limited thereto, and various other materials selected by the designer may also be used as the refrigerant.

The compressor 110 may suck the refrigerant 9*d* from the compressor refrigerant inlet 149 and compresses the sucked refrigerant into a high-temperature, high-pressure gas. The compressor 110 may include a motor 111 and suck the refrigerant 9*d* into the compressor 110 in accordance with rotation of the motor 111. The refrigerants 9*a* to 9*d* may circulate along the compressor 110, the condenser 120, the capillary pipe 130, and the heat exchanger 140 by a suction force of the compressor 110 for the refrigerant 9*d* constituting a cooling cycle. Thus, a circulation velocity of the refrigerant may be determined by the degree of operation of the compressor 110, e.g., a rotation speed of the motor 111. Accordingly, the degree of cooling the storage compartment 20 of the refrigerator 10 may be determined thereby.

The compressor 110 may include an inlet (not shown) through which the refrigerant 9*d* is introduced, a space (now shown) where the introduced refrigerant flows, the motor 111 rotating in the space and related parts, and an outlet (not shown) through which the refrigerant 9*a* is discharged. The inlet of the compressor 110 may be connected to the compressor refrigerant inlet 149 through which the refrigerant 9*d* is introduced such that the refrigerant 9*d* is introduced into the compressor 110. Thus, the compressor 110 may receive a vaporized refrigerant after the heat exchanger 140 absorbs heat therefrom.

According to an embodiment, the compressor 110 may be an inverter compressor. The motor 111 of the inverter compressor may rotate at various rotation speeds and thus control the circulation velocity of the refrigerant. A rotation speed of the motor 111 may be represented by using revolutions per minute (RPM).

The compressor 110 may rotate at various rotation speeds under the control of the compressor controller 200. For example, the compressor controller 200 may generate a control signal depending on conditions and transmit the control signal to the motor 111 of the compressor 110. The motor 111 of the compressor 110 may rotate at a first rotation speed, a second rotation speed, a third rotation speed, and a fourth rotation speed, in response to the received control signal. In this case, the motor 111 of the compressor 110 may change and rotate at the changed rotation speed. In this case, the motor 111 of the compressor 110 may rotate at a rotation speed varying in a stepwise manner and thus the compressor 110 operates based on the rotation speed varying in a stepwise manner. For example, the motor 111 of the compressor 110 operates at the rotation speed sequentially changing in the order of the first rotation speed, the second rotation speed higher than the first rotation speed, the third rotation speed higher than the second rotation speed, and the fourth rotation speed higher than the third rotation speed. This will be described in more detail later.

The high-temperature, high-pressure gaseous refrigerant 9*a* compressed in the compressor 110 may be transmitted to the condenser 120. To this end, the condenser refrigerant inlet 119 may be disposed between the compressor 110 and the condenser 120. The high-temperature, high-pressure gaseous refrigerant 9*a* obtained by the compressor 110 is transmitted to the condenser 120 through the condenser refrigerant inlet 119.

The condenser 120 may be installed at the rear surface 11*d* of the refrigerator 10 as illustrated in FIG. 3. If required, the condenser 120 may be disposed at a lower portion of the rear surface 11*d* of the refrigerator 10 or at a center of the rear surface 11*d* of the refrigerator 10 to be exposed to the outside for efficient heat discharge.

The condenser 120 may liquefy the high-temperature, high-pressure gaseous refrigerant 9*a* received from the compressor 110 to obtain a high-temperature, high-pressure liquid refrigerant 9*b*. The condenser 120 discharges heat while liquefying the introduced refrigerant 9*a* to decrease a temperature of the refrigerant 9*a*. The refrigerant condensed in the condenser 120 is transmitted to the capillary pipe 130 through the refrigerant channel 129 connecting the condenser 120 and the capillary pipe 130.

According to an embodiment, the condenser 120 may be implemented using a zigzag-shaped pipe. In this case, one end of the zigzag-shaped pipe may extend from the condenser refrigerant inlet 119 connected to the compressor 110, and the other end of the zigzag-shaped pipe may extend from the refrigerant channel 129 connected to the capillary pipe 130.

The refrigerant 9*b* condensed by the condenser 120 may be transmitted to the capillary pipe 130 through a capillary pipe inlet 129.

The capillary pipe 130 may be installed inside or outside the housing 11 of the refrigerator 10. The capillary pipe 130 may be implemented using a narrow pipe. The capillary pipe 130 may expand the high-temperature, high-pressure liquid refrigerant 9*b* into a refrigerant 9*c* in a mixed state of low-temperature, low-pressure gas and liquid and discharge the refrigerant 9*c* to a heat exchanger inlet 139 connected to the heat exchanger 140. According to an embodiment, an expansion valve may be used instead of the capillary pipe 130. In this case, the expansion valve may be a thermal electronic expansion valve using deformation of a bi-metal, a thermostatic electronic expansion valve using volume expansion of a sealing wax by heating, a pulse width modulating electronic expansion valve opening and closing a solenoid valve by a pulse signal, or a step motor electronic expansion valve opening and closing a valve using a motor.

The heat exchanger 140 may generate cool air 28 and supply the cool air 28 into the storage compartment 20. Particularly, since the refrigerant 9*c* expanded while passing through the capillary pipe 130 absorbs external latent heat in the heat exchanger 140, ambient temperature of the heat exchanger 140 decreases. Thus, the heat exchanger 140 supplies cool air to the surroundings. The cool air generated by the heat exchanger 140 is supplied into the storage compartment 20 in accordance with operation of a fan 29 to cool the inner space of the storage compartment 20. Accordingly, the temperature of air inside the storage compartment 20 may be controlled.

The heat exchanger 140 may be installed at an inner portion of the rear surface 11*d* of the housing 11 of the refrigerator 10 as illustrated in FIG. 3. In this case, the heat exchanger 140 may be installed around the storage compartment 20. If a plurality of storage compartments 21 to 23 are used, the refrigerator 10 may include a plurality of heat exchangers 140 respectively corresponding to the storage compartments 21 to 23 to efficiently control air temperatures inside the respective storage compartments 21 to 23.

The refrigerant channels 119, 129, 139, and 149 connects the compressor 110, the condenser 120, the capillary pipe 130, and the heat exchanger 140 as described above, and disposed at any portions in the housing 11 of the refrigerator 10 selected by the designer.

Referring to FIG. 3, the refrigerator 10 may be provided with a substrate assembly 299 including a processor to control the refrigerator 10. The substrate assembly 299 may include at least one semiconductor chip and related parts, and a substrate on which the semiconductor chip and related parts are mounted. The semiconductor chip and related parts installed in the substrate assembly 299 may include a processor serving as the compressor controller 200 and a semiconductor chip or a magnetic disc serving as a storage unit 300. The substrate assembly 299 may be electrically connected to a power supply 199 configured to supply power to various semiconductor chips and related parts, the compressor 110, and the like.

Although FIG. 3 illustrates that the compressor 110, the condenser 120, the heat exchanger 140, the refrigerant channels 119, 129, 139, and 149, and the substrate assembly 299 are disposed around the rear surface 11d of the refrigerator 10 for descriptive convenience, installation positions thereof are not limited thereto. According to an embodiment, the installation positions may also be changed by the designer.

Referring to FIG. 4, the refrigerator 10 may further include the storage compartment temperature sensing unit 180, the power supply 199, the compressor controller 200, a clock 210, and the storage unit 300 in addition to the compressor 110, the condenser 120, the heat exchanger 140, and the refrigerant channels 119, 129, 139, and 149.

The storage compartment temperature sensing unit 180 may sense an internal temperature of the storage compartment 20. The storage compartment temperature sensing unit 180 may be implemented using the temperature sensor to sense temperature by using changes in electrical resistance, the thermostat 181, or the like as described above, and thus descriptions thereof will not be repeated.

The power supply 199 may supply power to various parts of the refrigerator 10. The power supply 199 receives commercial power from a power source, converts the received commercial power into an appropriate voltage and/or current, and supplies the converted voltage and/or current into the various parts of the refrigerator 10. Also, the power supply 199 may be implemented using a battery capable of storing electric energy. In this case, the battery may be rechargeable. According to an embodiment, the power supply 199 may supply electric energy of a predetermined voltage and/or current to the compressor 110 via a circuit provided in the substrate assembly 299 or a separate wire. In this case, the power supply 199 may supply a predetermined voltage and/or current to the compressor 110 via the compressor controller 200.

Figure 5:
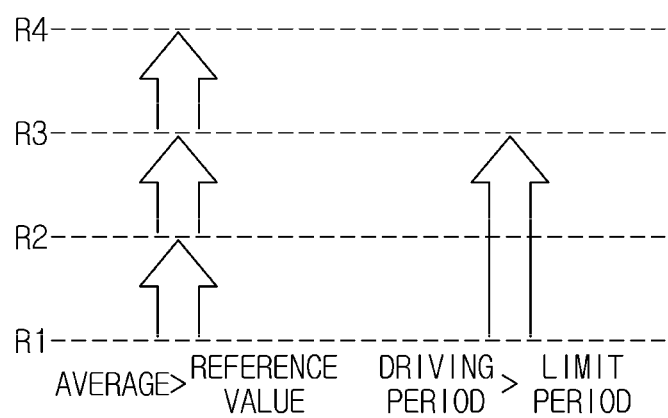
FIG. 5 is a diagram schematically illustrating a method of controlling rotation speed of a compressor motor.

FIG. 5 is a diagram schematically illustrating a method of controlling rotation speed of a compressor motor.

The compressor controller 200 may control the overall operation of the refrigerator 10. The compressor controller 200 may control operation of the refrigerator 10 in accordance with a command input via the user interface 400 or in accordance with pre-stored settings. The compressor controller 200 may transmit a control signal to the compressor 110 to drive the motor 111 of the compressor 110 at a predetermined rotation speed, thereby controlling the circulation velocity of the refrigerant passing through the condenser 120, the capillary pipe 130, and the heat exchanger 140.

According to an embodiment, the compressor controller 200 may increase and/or decrease the rotation speed of the motor 111 in a stepwise manner by transmitting a control signal to the motor 111 of the compressor 110, if preset conditions are satisfied. For example, if a temperature sensed by the storage compartment temperature sensing unit 180 is at or below a predetermined temperature or a circuit is connected by the thermostat, the compressor controller 200 may control the motor 111 of the compressor 110 to rotate at a first rotation speed R1.

Also, after the motor 111 starts rotation at the first rotation speed R1, the compressor controller 200 may calculate an average of levels of electric signals applied to the motor 111 of the compressor 110, compares the calculated average with a reference value, and increase the rotation speed of the motor 111 of the compressor 110 from the first rotation speed R1 to a second rotation speed R2 and/or from the second rotation speed R2 to a third rotation speed R3 when the calculated average is greater than the reference value as illustrated in FIG. 5.

In addition, if a driving period of the motor 111 exceeds a predefined limit period, the compressor controller 200 may increase the rotation speed of the motor 111 from the first rotation speed R1 to the third rotation speed R3.

On the contrary, the compressor controller 200 may calculate an average of levels of electric signals applied to the motor 111 of the compressor 110, compare the calculated average with the reference value, and decrease the rotation speed of the motor 111 from the third rotation speed R3 to the second rotation speed R2 and/or from the second rotation speed R2 to the first rotation speed R1 depending on the result of comparison. As described above, the compressor controller 200 may also decrease the rotation speed of the motor 111 from the third rotation speed R3 to the first rotation speed R1 or the second rotation speed R2 if the driving period of the motor 111 exceeds the limit period.

The compressor controller 200 may be implemented using a central processing unit (CPU) or a micro controller unit (MCU) which may include at least one semiconductor chip and a circuit connected thereto.

Operation of the compressor controller 200 will be described in more detail later.

The clock 210 may measure time and a period of time elapsed from one given time point to another given time point, if required. The clock 210 may transmit the measured time to the compressor controller 200, and the compressor controller 200 may determine whether a time period during which the compressor 110 rotates at a given rpm exceeds a reference period 310 and/or a limit period 340 or whether a time elapsed after the compressor 110 starts operation exceeds a fourth limit period 340, based on the time received from the clock 210.

Figure 6:
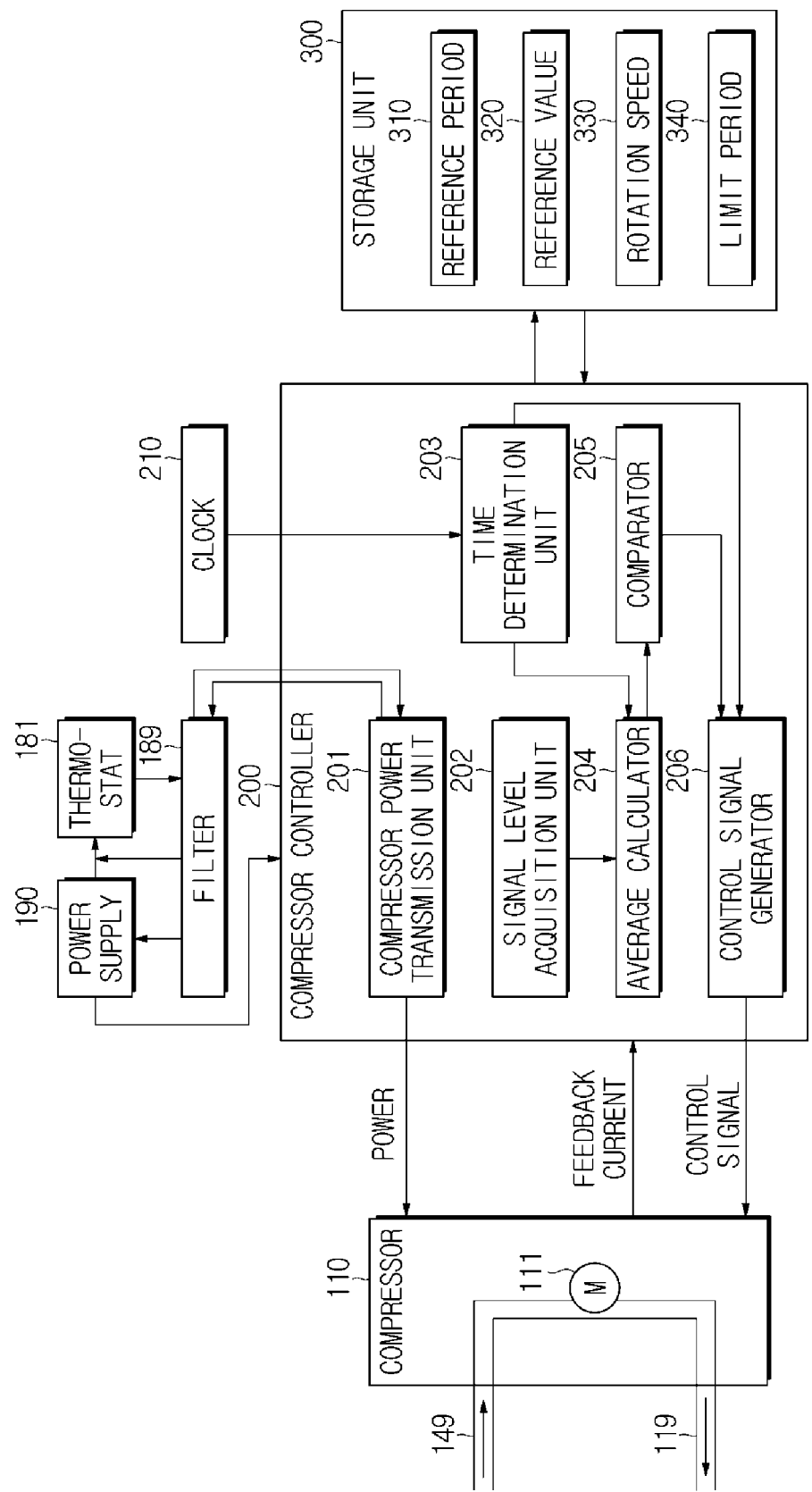
FIG. 6 is a control block diagram illustrating a control flow of the compressor controller and the compressor.

The storage unit 300 assists operation of the compressor controller 200 and temporarily or nontemporarily store data required for the operation of the compressor controller 200. For example, the storage unit 300 may store a reference period 310 (FIG. 6), a reference value 320 (FIG. 6), a rotation speed 330 (FIG. 6), and/or a limit period 340 (FIG. 6). The compressor controller 200 may control the rotation speed of the motor 111 of the compressor 110 by using the reference period 310, the reference value 320, the rotation speed 330, and/or the limit period 340 stored in the storage unit 300. The storage unit 300 may include at least one of a main memory storage and an auxiliary memory storage. The storage unit 300 may be implemented using various data storage devices such as semiconductor storage devices, magnetic disc storage devices, or magnetic drum storage devices.

Hereinafter, operation of the compressor controller and the compressor will be described in more detail.

FIG. 6 is a control block diagram illustrating a control flow of the compressor controller and the compressor. Although FIG. 6 illustrates the thermostat 181 as an example of the storage compartment temperature sensing unit 180, any other temperature sensor may also be used instead of the thermostat 181.

Referring to FIG. 6, the thermostat 181, a filter 189, and the power supply 199 may be connected via a wire or a circuit. In this case, when a temperature of the storage compartment 20 increases and exceeds a predetermined temperature, the thermostat 181 is electrically connected by the increase in temperature such that electric energy may be supplied to the filter 189 from the power supply 199 via the thermostat 181.

The filter 189 converts the received electric signal into a form available in the compressor 110 or the compressor controller 200. For example, the filter 189 may convert alternating current (AC) into direct current (DC) and/or change a voltage level or a current level of an electric signal by stepping up or down the electric signal. The electric signal converted by the filter 189 may be transmitted to the motor 111 of the compressor 110 directly or via the compressor controller 200. The filter 189 may also be dispensed with.

According to an embodiment, the compressor controller 200 may include a compressor power transmission unit 201, a signal level acquisition unit 202, a time determination unit 203, an average calculator 204, a comparator 205, and a control signal generator 206.

The compressor power transmission unit 201 may receive an electric signal depending on a state change of the thermostat 181 and transmit the received electric signal to the motor 111 of the compressor 110. The compressor power transmission unit 201 may transmit the received electric signal to the motor 111 after converting and/or processing the electric signal appropriately. In this case, the compressor power transmission unit 201 may generate an electric signal having a voltage, current, and/or power suitable for a target rotation speed of the motor 111, e.g., the first to fourth rotation speeds R1 to R4, and transmit the generated electric signal to the motor 111. The compressor power transmission unit 201 may be electrically connected to the motor 111, the thermostat 181, the filter 189, and/or the power supply 199 such that the electric signal may be transmitted therebetween.

The signal level acquisition unit 202 may sense and measure a level of the electric signal, e.g., a level of voltage, current, and/or power, applied to the motor 111 of the compressor 110 and temporarily or nontemporarily store the result of measurement.

According to an embodiment, the signal level acquisition unit 202 may sense a feedback current output from the motor 111 and sense and measure the levels of the electric signals applied to the motor 111 of the compressor 110 by using the sensed feedback current. For example, a power application unit (not shown) to provide the motor 111 with power and a feedback current sensor (not shown) to sense a feedback current differently output in accordance with loads applied to the motor 111 may be disposed between the motor 111 and the compressor controller 200 to measure the feedback current. The power application unit may be implemented using various types of inverters. The feedback current sensor may branch out of a circuit or wire connecting the power application unit and the motor 111, sense the feedback current transmitted between the power application unit and the motor 111, and transmit a sensing result to the signal level acquisition unit 202.

Figure 7A:
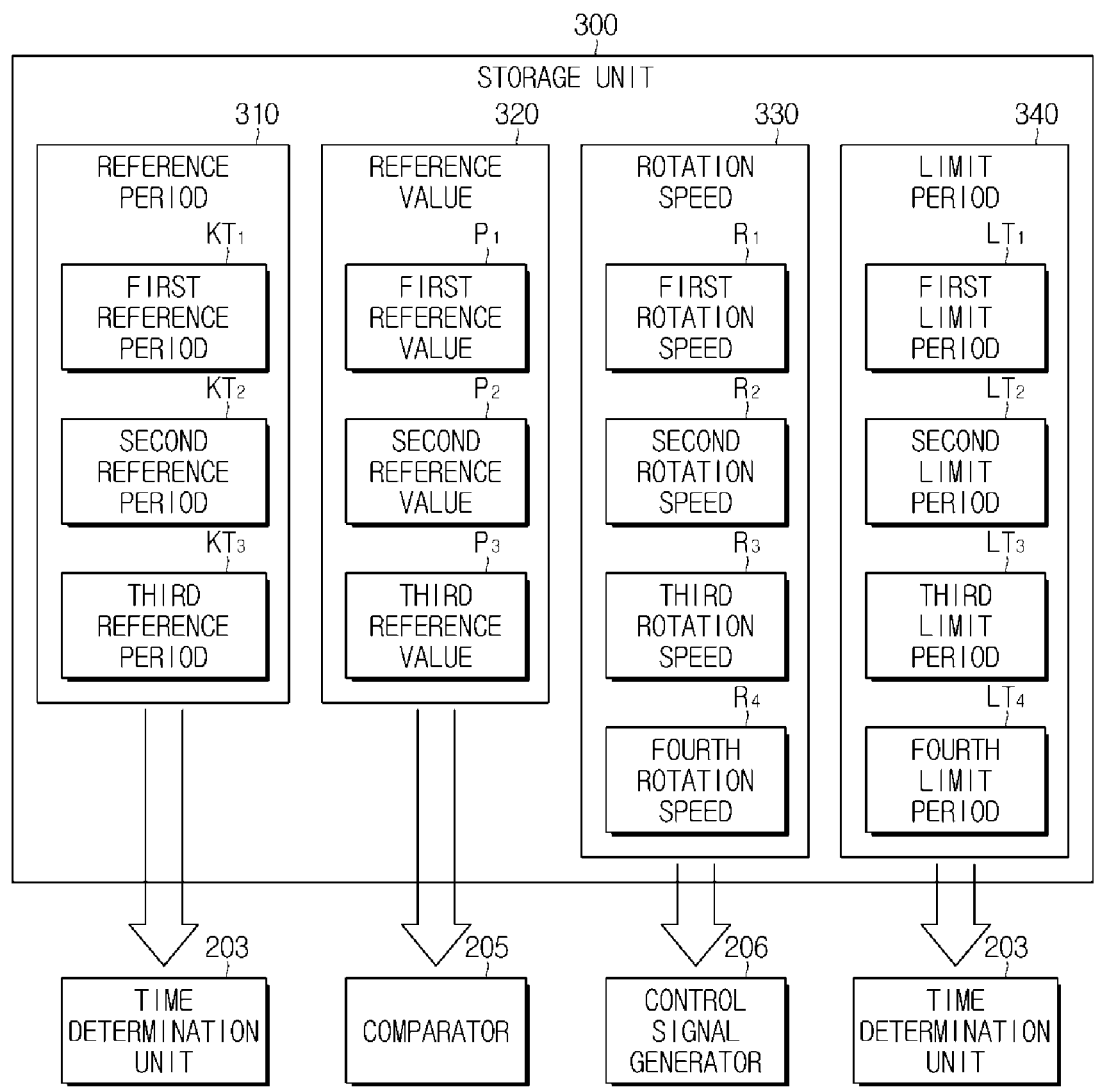
FIG. 7A is a diagram exemplarily illustrating data stored in the storage unit.

The time determination unit 203 may determine the elapse of a reference period from transmission of the electric signal to the signal level acquisition unit 202 based on a signal received from the clock 210 and the reference period 310 stored in the storage unit 300. According to an embodiment, the time determination unit 203 may receive, from the storage unit 300, information about the reference period 310, which varies in accordance with a current rotation speed of the motor 111, e.g., first to third reference periods KT1 to KT3 (FIG. 7A), and determine the elapse of the reference period 310 by using the signal received from the clock 210 and at least one of the first to third reference periods KT1 to KT3 (FIG. 7A).

Also, the time determination unit 203 may determine the elapse of a limit period based on the signal received from the clock 210 and the limit period 340 stored in the storage unit 300. According to an embodiment, the time determination unit 203 may receive, from the storage unit 300, information about the limit period 340, which varies in accordance with the current rotation speed of the motor 111, e.g., first to third limit periods LT1 to LT3 (FIG. 7A), and determine the elapse of the limit period 340 by using the signal received from the clock 210 and at least one of the first to third limit periods LT1 to LT3 (FIG. 7A)

The time determination unit 203 may define at least one variable to determine the elapse of the reference period 310 and/or the elapse of the limit period 340. Hereinafter, a variable used to count time is referred to as a time count value. The time count value may be defined by variable declaration. In this case, the time determination unit 203 may define a time count value corresponding to the reference period 310 and a time count value corresponding to the limit period 340, independently. If required, the time determination unit 203 may further define a time count value corresponding to a fourth limit period LT4. The time determination unit 203 may increase the predefined time count value with time based on the signal received from the clock 210 and compare the increased time count value with a corresponding time period, e.g., the reference period 310 and/or the limit period 340, to determine the elapse of the reference period 310 and/or the limit period 340. Upon determination that the reference period 310 and/or the limit period 340 has elapsed, the time determination unit 203 may reset the time count value. Here, the resetting of the time count value may refer to setting the time count value to 0.

The time determination unit 203 may transmit a determination result of the elapse of the reference period to the average calculator 204 and a determination result of the elapse of the limit period to the control signal generator 206.

The average calculator 204 may calculate an average of levels of electric signals. Particularly, the average calculator 204 may calculate an average of voltage levels, current levels, and/or power levels of electric signals. In this case, since the compressor controller 200 receives different feedback currents in accordance with the rotation speed of the motor 111, the average calculated by the average calculator 204 may vary depending on the rotation speed of the motor 111. Hereinafter, an average calculated while the motor 111 rotates at the first rotation speed R1 is referred to as a first average, an average calculated while the motor 111 rotates at the second rotation speed R2 is referred to as a second average, and an average calculated while the motor 111 rotates at the third rotation speed R3 is referred to as a third average.

If the reference period 310 is set to be shorter than the limit period 340, the average calculator 204 may calculate an average of levels of electric signals during the reference period 310. If the reference period 310 is set to be longer than the limit period 340, the average calculator 204 may calculate an average of levels of electric signals during the limit period 340, compare the average with the reference value 320, and further calculate an average of levels of electric signals during the reference period 310 depending on a comparison result.

The calculated average may be transmitted to the comparator 205.

The comparator 205 may receive information about the reference value 320 from the storage unit 300, compare the calculated average with the reference value 320, and transmit a comparison result to the control signal generator 206. In this case, the comparator 205 may receive different reference values 320, e.g., first to third reference values P1 to P3 (FIG. 7A), in accordance with the rotation speed of the motor 111. In this case, for example, the comparator 205 may compare the first average with the first reference value P1, the second average with the second reference value P2, and the third average with the third reference value P3.

The control signal generator 206 may generate a control signal based on the comparison result received from the comparator 205 and transmit the control signal to the motor 111 of the compressor 110. In this case, if the calculated average is greater than the reference value 320, the control signal generator 206 may generate a control signal to increase the rotation speed of the motor 111 and transmit the control signal to the motor 111 to control the motor 111 to rotate at a higher rotation speed. Also, if the calculated average is less than the reference value 320, the control signal generator 206 may generate a control signal to maintain the rotation speed of the motor 111 and transmit the control signal to the motor 111, or may not transmit any control signal to the motor 111, such that the motor 111 rotates at a current rotation speed.

In addition, the control signal generator 206 may generate a control signal based on a result of determining whether the driving period of the motor 111 received from the time determination unit 203 exceeds the limit period 340 and transmit the generated control signal to the motor 111 of the compressor 110. In this case, if the driving period of the motor 111 exceeds the limit period 340, the control signal generator 206 may generate a control signal to increase the rotation speed of the motor 111 and transmit the control signal to the motor 111, such that the motor 111 rotates at an increased rotation speed in accordance with the received control signal.

According to an embodiment, the control signal generator 206 may receive information about the rotation speed 330 stored in the storage unit 300 and control the rotation speed of the motor 111 of the compressor 110 based on the received information about the rotation speed 330. In this case, the control signal generator 206 may receive different information about the rotation speed 330, depending on the current rotation speed of the motor 111 of the compressor 110, e.g., first to third rotation speeds R1 to R3 (FIG. 7A), generate a control signal based on the received information about the rotation speed, and transmit the control signal to the compressor 110.

Also, according to an embodiment, the control signal generator 206 may control the compressor 110 to rotate at a predetermined rotation speed when the electric signal is received in accordance with operation of the thermostat 181 or control the compressor 110 to start operation at a given time after receiving the electric signal in accordance with operation of the thermostat 181. Also, the control signal generator 206 may generate a control signal such that the compressor 110 starts operation at a given time after the compressor 110 stops operation, and transmit the control signal to the compressor 110.

FIG. 7A is a diagram exemplarily illustrating data stored in the storage unit. FIG. 7B is a table exemplarily illustrating rotation speeds, reference values, reference periods, and limit periods.

As described above the storage unit 300 may store information about the reference period 310, the reference value 320, the rotation speed 300, and the limit period 340 and provide the stored information to the compressor controller 200 upon request from the compressor controller 200.

The reference period 310 indicates a period of time during which the electric signals are input for average calculation of the average calculator 204. In other words, electric signals input during the reference period 310 are used for average calculation of the average calculator 204. According to an embodiment, the reference period 310 may include a first reference period KT1, a second reference period KT2, and a third reference period KT3. The compressor controller 200 use the first reference period KT1 if the motor 111 of the compressor 110 operates at the first rotation speed R1, the second reference period KT2 if the motor 111 operates at the second rotation speed R2, and the third reference period KT3 if the motor 111 operates at the third rotation speed R3.

The first reference period KT1, the second reference period KT2, and the third reference period KT3 may be defined such that all of the first reference period KT1, the second reference period KT2, and the third reference period KT3 are the same or at least two thereof are different from each other. Also, the first reference period KT1, the second reference period KT2, and the third reference period KT3 may be different as illustrated in FIG. 7B. For example, if the motor 111 rotates at the first rotation speed R1, e.g., at 1400 rpm, the first reference period KT1 may be set to 5 minutes. If the motor 111 rotates at the second rotation speed R2, e.g., at 2000 rpm, the second reference period KT2 may be set to 40 minutes. When the motor 111 rotates at the third rotation speed, e.g., at 2600 rpm, the third reference period KT3 may be set to 10 minutes. Although FIG. 7B illustrates the first to third reference periods KT1 to KT3 as numerical values, these values are examples and the first to third reference periods KT1 to KT3 may be defined in various other manners by the designer.

Although the reference period 310 including three reference periods, i.e., the first reference period KT1, the second reference period KT2, and the third reference period KT3, has been described above, the number of the reference period 310 is not limited thereto. According to an embodiment, the reference period 310 may include four or more reference periods or two reference periods. The two reference periods or four or more reference periods may be the same, at least two thereof may be different, or all of the reference periods may be different.

The reference value 320 refers to a value used for comparison performed by the comparator 205 with an average calculated by the average calculator 204. The reference value 320 may be set to correspond to the average calculated by the average calculator 204. For example, when the average calculator 204 calculates an average of power levels of the electric signals, the reference value 320 may also be defined using a unit of power corresponding thereto.

According to an embodiment, the reference value 320 may include a first reference value P1, a second reference value P2, and a third reference value P3 as illustrated in FIGS. 7A and 7B. The first reference value P1 is used for comparison with a first average, which is an average of levels of electric signals applied to the motor 111 rotating at the first rotation speed R1. The second reference value P2 is used for comparison with a second average, which is an average of levels of electric signals applied to the motor 111 rotating at the second rotation speed R2. The third reference value P3 is used for comparison with a third average, which is an average of levels of electric signals applied to the motor 111 rotating at the third rotation speed R3.

The first reference value P1, the second reference value P2, and the third reference value P3 may be defined such that all of the first reference value P1, the second reference value P2, and the third reference value P3 are the same or at least two thereof are different from each other. Also, as illustrated in FIG. 7B, the first reference value P1, the second reference value P2, and the third reference value P3 may be defined to be different. For example, the first reference value P1 used for comparison with the first average while the motor 111 operates at the first rotation speed R1, e.g., at 1400 rpm, may be set to 44.5 W. The second reference value P2 used for comparison with the second average while the motor 111 operates at the second rotation speed R2, e.g., at 2000 rpm, may be set to 56 W. Also, the third reference value P3 used for comparison with the third average while the motor 111 operates at the third rotation speed R3, e.g., 2600 rpm, may be set to 67 W. Although FIG. 7B illustrates the first to third reference values P1 to P3 as numerical values, these values are examples and the first to third reference values P1 to P3 may also be set in various other manners by the designer.

Although the reference value 320 including three reference values, i.e., the first reference value P1, the second reference value P2, and the third reference value P3, has been described above, the number of the reference value 320 is not limited thereto. According to an embodiment, the reference value 320 may also include four or more reference values or two reference values. In this case, the reference values may be the same, at least two thereof may be different, or all of the reference values may be different.

The rotation speed 330 refers to a target rotation speed of the motor 111. The rotation speed 330 may be transmitted to the control signal generator 206. The control signal generator 206 may generate the control signal in accordance with the received rotation speed 330 and transmit the control signal to the motor 111. Thus, the motor 111 may operate at the received rotation speed 330.

For example, the rotation speed 330 may include the first rotation speed R1, the second rotation speed R2, the third rotation speed R3, and the fourth rotation speed R4. The first rotation speed R1, the second rotation speed R2, the third rotation speed R3, and the fourth rotation speed R4 may be defined to be different. In this case, the first rotation speed R1 may be lower than the second rotation speed R2, the second rotation speed R2 may be lower than the third rotation speed R3, and the third rotation speed R3 may be lower than the fourth rotation speed R4. More particularly, as illustrated in FIG. 7B, the first rotation speed R1 may be set to 1400 rpm, the second rotation speed R2 may be set to 2000 rpm, the third rotation speed R3 may be set to 2600 rpm, and the fourth rotation speed R4 may be set to 3200 rpm. In this case, the control signal generator 206 may generate the control signal such that the motor 111 rotates at any one of the first rotation speed R1, the second rotation speed R2, the third rotation speed R3, and the fourth rotation speed R4 under designated conditions. Although FIG. 7B illustrates the first to fourth rotation speeds R1 to R4 as numerical values, these values are examples and the first to fourth rotation speeds R1 to R4 may be defined in various other manners by the designer.

Although the rotation speed 330 including four rotation speeds, i.e., the first to fourth rotation speeds R1 to R4, has been described above, the number of the stored rotation speed 330 is not limited thereto. According to an embodiment, the storage unit 300 may store two rotation speeds or four or more rotation speeds.

The limit period 340 indicates a limit period of time during which the motor 111 operates at a predetermined rotation speed (R1 to R3). For example, if the motor 111 starts rotation at a predetermined rotation speed, e.g., one of the first to third rotation speeds R1 to R3, the limit period 340 may indicate a limit period of time during which the motor 111 rotates at the same speed after the rotation was started at the predetermined rotation speed. According to an embodiment, the limit period 340 may include the first limit period LT1, the second limit period LT2, and the third limit period LT3. The first limit period LT1 may indicate a limit period of time during which the motor 111 rotates at the first rotation speed R1 when the motor 111 rotates at the first rotation speed R1. The second limit period LT2 may indicate a limit period of time during which the motor 111 rotates at the second rotation speed R2 when the motor 111 rotates at the second rotation speed R2. The third limit period LT3 may indicate a limit period of time during which the motor 111 rotates at the third rotation speed R3 when the motor 111 rotates at the third rotation speed R3.

The first limit period LT1, the second limit period LT2, and the third limit period LT3 may be the same as illustrated in FIG. 7B, at least two thereof may be different, or all of the limit periods LT1 to LT3 may be different. Although the first limit period LT1, the second limit period LT2, and the third limit period LT3 are exemplarily set to 30 minutes in FIG. 7B, the first to third limit periods LT1 to LT3 may also be set differently.

According to an embodiment, the first to third reference periods KT1 to KT3 may be shorter or longer than the first to third limit periods LT1 to LT3 respectively corresponding thereto. For example, as illustrated in FIG. 7B, the first reference period KT1 may be set to be shorter than the first limit period LT1 and the third reference period KT3 may be set to be shorter than the third limit period LT3. On the contrary, the second reference period KT2 may be set to be longer than the second limit period LT2. Also, the first reference period KT1 may be set to be longer than the first limit period LT1, the second reference period KT2 may be set to be shorter than the second limit period LT2, and the third reference period KT3 may be set to be longer than the third limit period LT3 according to an embodiment. The first to third reference periods KT1 to KT3 may also be set in various manners by the designer.

Also, the limit period 340 may indicate a time point to start operation of the motor 111 at the fourth rotation speed R4 after the compressor 110 starts operation. The limit period of time indicating the time point to start operation of the motor 111 at the fourth rotation speed R4 is referred to as the fourth limit period LT4.

Each of the reference period 310, the reference value 320, the rotation speed 330, and/or the limit period 340 may be determined by the designer. In this case, the designer may determine the reference period 310, the reference value 320, the rotation speed 330, and/or the limit period 340 based on a separate logic operation. Alternatively, each of the reference period 310, the reference value 320, the rotation speed 330, and the limit period 340 may also be determined by experiences of the designer. In addition, each of the reference period 310, the reference value 320, the rotation speed 330, and/or the limit period 340 may be set or changed by the user. In this case, the user may change each of the reference period 310, the reference value 320, the rotation speed 330, and/or the limit period 340 using, for example, the user interface 400.

Figure 8:
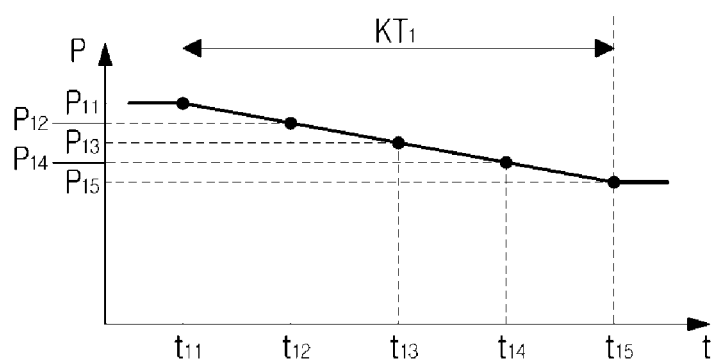
FIG. 8 is a graph for describing a method of calculating of a first average of power of the compressor rotating at a first rotation speed.
Figure 9:
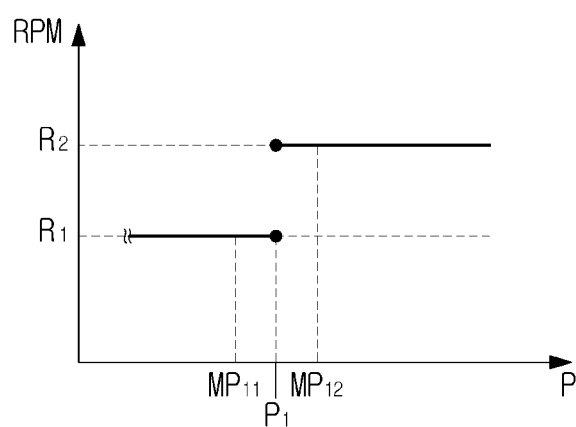
FIG. 9 is a graph for describing a method of determining a rotation speed of the compressor based on the first average.
Figure 10:
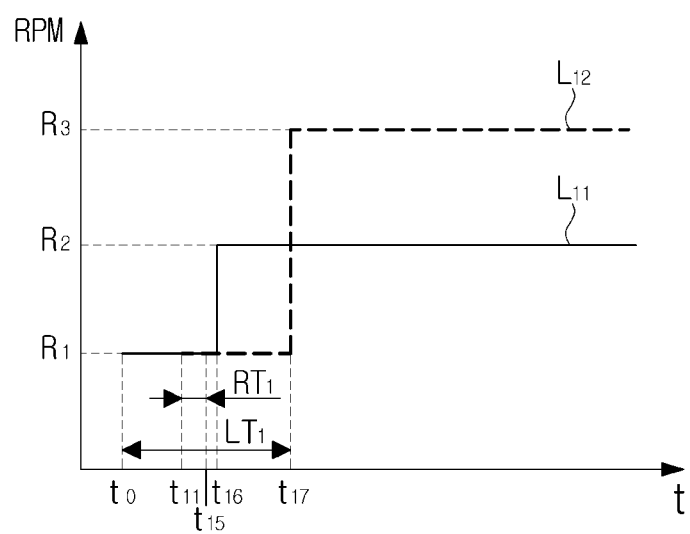
FIG. 10 is a graph for describing a method of changing a rotation speed of the compressor based on the first average and a first limit period.

FIG. 8 is a graph for describing a method of calculating of a first average of power of the compressor rotating at a first rotation speed. FIG. 9 is a graph for describing a method of determining a rotation speed of the compressor based on the first average. FIG. 10 is a graph for describing a method of changing a rotation speed of the compressor based on the first average and a first limit period.

FIG. 8 illustrates a gradual decrease in power applied to the compressor 110 as a graph for descriptive convenience. However, the change in power is not limited thereto, power applied to the compressor 110 may gradually increase or may be repeatedly increase and decrease. In the latter case, the first average may also be calculated as follows.

When an electric signal, i.e., a driving signal, is applied to the compressor controller 200 upon conduction of the thermostat 181, the compressor 110 starts operation. Upon starting operation of the compressor 110, a lubricant is supplied to the compressor 110 for a given period of time, e.g., for 2 minutes. Upon completion of the supply of the lubricant, the compressor 110 starts operation at a predetermined rotation speed, e.g., at the first rotation speed R1. In this case, the control signal generator 206 of the compressor controller 200 may generate a control signal to control the motor 111 of the compressor 110 to rotate at the first rotation speed R1 and transmit the generated control signal to the compressor 110. As a result, the compressor 110 may operate at the first rotation speed R1 in accordance with the received control signal.

When the motor 111 of the compressor 110 starts operation at the first rotation speed R1, an electric signal of a predetermined power may be applied to the motor 111 of the compressor 110. The signal level acquisition unit 202 of the compressor controller 200 may sense a feedback current received from the compressor 110 and store a level of the received feedback current, e.g., power of the feedback current P11 to P15 as illustrated in FIG. 8. In this case, the level of the received feedback current may be stored periodically at regular time points t11 to t15 or non-periodically.

The time determination unit 203 counts a period of time from a time point t0 at which the compressor 110 starts operation at the first rotation speed R1. If the counted time, i.e., a time count value after starting the counting of time, is the same as or exceeds the first reference period KT1, the time determination unit 203 may transmit a determination result informing that the counted time exceeds the first reference period KT1 to the average calculator 204. After transmitting the determination result indicating that the counted time exceeds the first reference period KT1 to the average calculator 204, the time determination unit 203 resets the time count value and restarts counting of time. If the re-counted time (t15−t11) is the same as or exceeds the first reference period KT1, the time determination unit 203 transmits a determination result indicating that the re-counted time exceeds the reference period and resets the time count value, again. Thus, the time determination unit 203 may repeatedly transmit information about the elapse of the first reference period KT1 to the average calculator 204.

The average calculator 204 calculates a first average MP11 or MP12 of power levels P11 to P15 of the feedback current during the first reference period KT1 in accordance with the electric signal received from the time determination unit 203.

The comparator 205 compares the first average MP11 or MP12 with the first reference value P1 and transmits a determination result indicating that the first average MP11 is less than the first reference value P1 or the first average MP12 is greater than the first reference value P1 to the control signal generator 206.

As illustrated in FIG. 9, if the calculated first average MP11 is less than the first reference value P1, the control signal generator 206 may determine the rotation speed of the motor 111 as the first rotation speed R1, generate a control signal corresponding thereto, and directly transmit the generated control signal to the compressor 110. According to an embodiment, the control signal generator 206 may also transmit the control signal to the compressor power transmission unit 201 such that power corresponding to the first rotation speed R1 is supplied to the compressor 110. Accordingly, the motor 111 of the compressor 110 may keep rotating at the first rotation speed R1. If the motor 111 of the compressor 110 continues to rotate at the first rotation speed R1, the compressor controller 200 may repeat the aforementioned process to re-determine the rotation speed of the motor 111 of the compressor 110.

If the calculated first average MP12 is greater than the first reference value P1, the control signal generator 206 may determine the rotation speed of the motor 111 as the second rotation speed R2 higher than the first rotation speed R1, generate a control signal corresponding thereto, and directly transmit the generated control signal to the compressor 110 or the compressor power transmission unit 201. Accordingly, the rotation speed of the motor 111 of the compressor 110 increases as illustrated in FIG. 10, such that the motor 111 rotates at the second rotation speed R2 (L11). In this case, a time point t6 at which at the motor 111 starts rotation at the second rotation speed R2 may be the same as or later than a time point t15 at which the first average MP11 or MP12 is measured.

Also, the time determination unit 203 may count a period of time from a time point t0 at which the compressor 110 starts operation at the first rotation speed R1. If the counted time (t17−t0) is the same as or exceeds the first limit period LT1, the time determination unit 203 may transmit a determination result indicating that the counted time exceeds the first limit period LT1 to the control signal generator 206. Here, the first limit period LT1 may be set to be longer than the first reference period RT1 as illustrated in FIG. 10. Upon receiving the information indicating that the counted time exceeds the first limit period LT1, the control signal generator 206 may determine the rotation speed of the motor 111 as the third rotation speed R3, generate a control signal corresponding thereto, and transmit the generated control signal to the compressor 110 or the compressor power transmission unit 201. Accordingly, the rotation speed of the motor 111 of the compressor 110 increases, and the motor 111 rotates at the third rotation speed R3 (L12). Thus, even when the first average MP11 or MP12 is not greater than the first reference value P1, the rotation speed of the compressor 110 may increase after the elapse of a given time period LT1.

When the rotation speed of the motor 111 is shifted from the first rotation speed R1 to another rotation speed, e.g., the second rotation speed R2 or the third rotation speed R3, variables used in the signal level acquisition unit 202, the time determination unit 203, and the average calculator 204 may be reset. In this case, variables for the entire driving period of the compressor 110 determined by the time determination unit 203 may not be reset.

As the compressor controller 200 controls operation of the compressor 110 as described above, the motor 111 rotates at a relatively lower rotation speed when a lower load, i.e., a lower level of the feedback current, is applied thereto and at a relatively higher rotation speed when a higher load, i.e., a higher level of the feedback current is applied thereto. Thus, power consumption may decrease or cooling rates of the storage compartment 20 may increase, if required.

Figure 11:
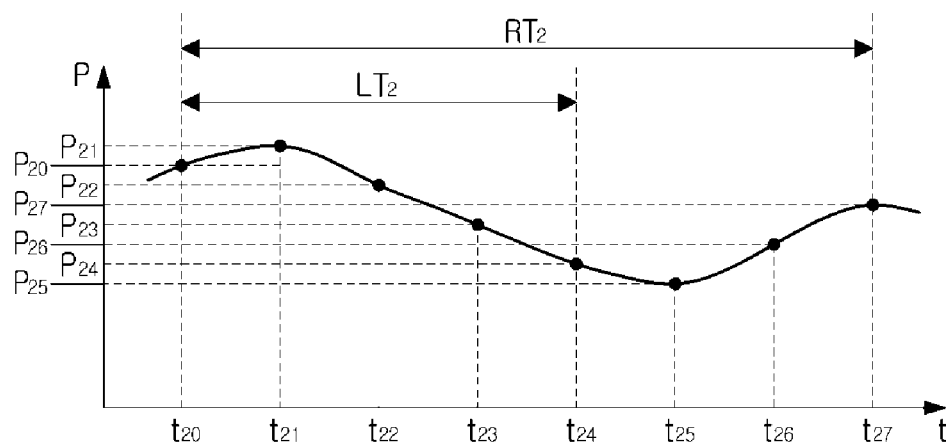
FIG. 11 is a graph for describing a method of calculating a second average of power of the compressor rotating at the second rotation speed.
Figure 12:
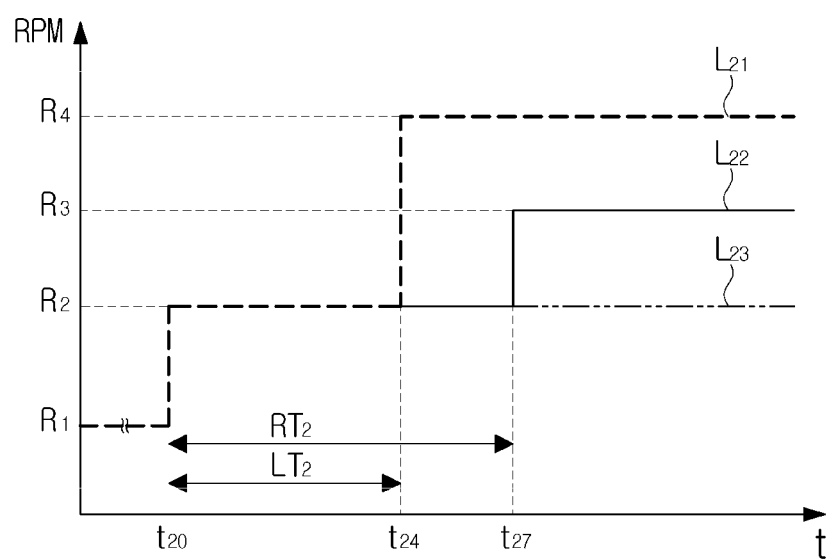
FIG. 12 is a graph for describing a method of changing a rotation speed of the compressor based on the second average and a second limit period.
Figure 13:
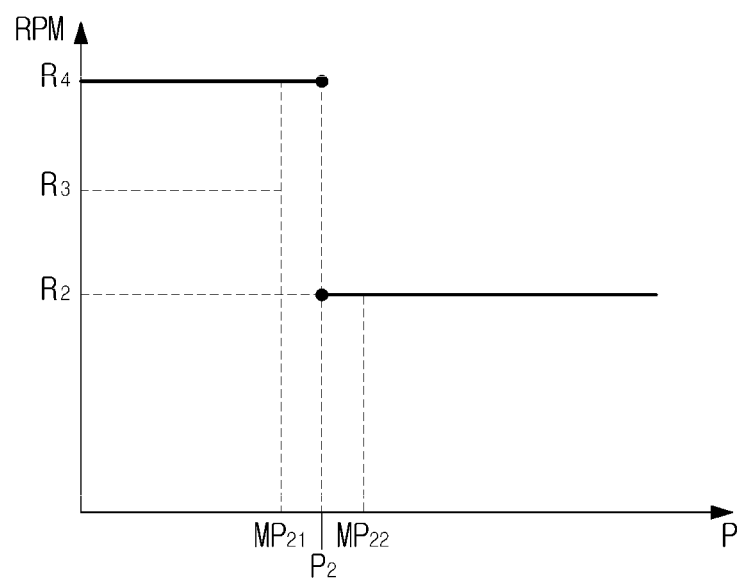
FIG. 13 is a graph for describing a method of determining a rotation speed of the compressor based on a calculation result of the second average during the second limit period.
Figure 14:
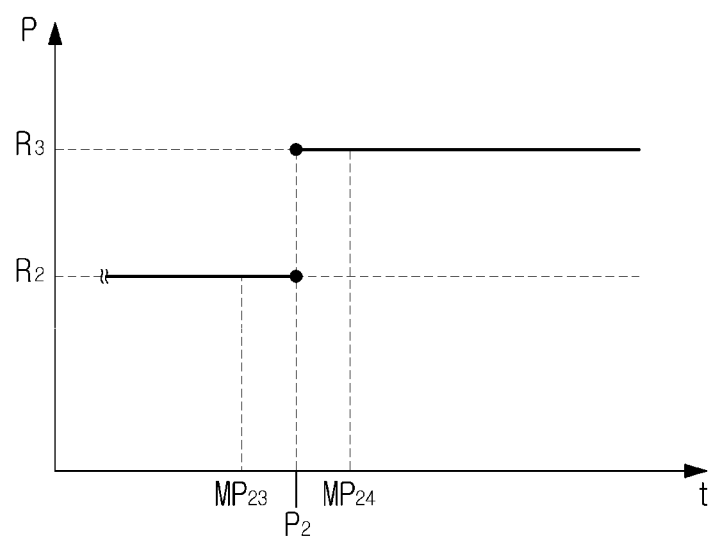
FIG. 14 is a graph for describing a method of determining a rotation speed of the compressor based on a calculation result of the second average during a second reference period.

FIG. 11 is a graph for describing a method of calculating a second average of power of the compressor rotating at the second rotation speed. FIG. 12 is a graph for describing a method of changing a rotation speed of the compressor based on the second average and a second limit period. FIG. 13 is a graph for describing a method of determining a rotation speed of the compressor based on a calculation result of the second average during the second limit period. FIG. 14 is a graph for describing a method of determining a rotation speed of the compressor based on a calculation result of the second average during a second reference period. Although FIG. 11 exemplarily illustrates a change of power applied to the compressor 110 for descriptive convenience, the power change is not limited thereto.

As described above, if the motor 111 of the compressor 110 operates at the second rotation speed R2 (L11), the signal level acquisition unit 202 stores levels of the feedback current, e.g., power levels P20 to P27 of the feedback current, received from the compressor 110 periodically at regular time points t21 to t27 as illustrated in FIG. 11. In this case, the second limit period LT2 (t24–t20) may be shorter than a second reference period RT2 (t27–t20) as illustrated in FIGS. 7B and 11.

The time determination unit 203 counts a period of time from a time point t20 at which the compressor 110 starts operation at the second rotation speed R2. If the second limit period LT2 (t24–t20) is set to be shorter than the second reference period RT2 (t27–t20), the time determination unit 203 may determine whether the counted time is the same as or exceeds the second limit period LT2 and transmit a determination result indicating that the counted time exceeds the second limit period LT2 to the average calculator 204. After the elapse of the second limit period LT2, the time determination unit 203 may reset the time count value for the second limit period LT2 and re-determine the elapse of the second limit period LT2.

The average calculator 204 may calculate an average MP21 or MP22 of power levels P20 to P24 of the feedback current during the second limit period LT2 in accordance with the electric signal received from the time determination unit 203.

The comparator 205 may compare the second average MP21 or MP22 of power levels P20 to P24 of the feedback current during the second limit period LT2 with the second reference value P2 obtained from the storage unit 300 and transmit a comparison result to the control signal generator 206 upon determination that the calculated second average MP21 is less than the second reference value P2 during the second limit period LT2. On the contrary, upon determination that the second average MP22 is greater than the second reference value P2 during the second limit period LT2, the comparator 205 may transmit the determination result to the control signal generator 206 or wait until another second average MP23 or MP24 of the power levels P20 to P27 of the feedback current during the second reference period RT2 is received from the average calculator 204.

As illustrated in FIG. 13, if the calculated second average MP21 is less than the second reference value P2 during the second limit period LT2, the control signal generator 206 may determine the rotation speed of the motor 111 as the fourth rotation speed R4, generate a control signal corresponding thereto, and directly transmit the generated control signal to the motor 111 of the compressor 110 or to the compressor power transmission unit 201. Accordingly, the compressor 110 operates at the fourth rotation speed R4 (L21). Meanwhile, if a comparison result indicating that the second average MP22 is greater than the second reference value P2 during the second limit period LT2 is transmitted to the control signal generator 206, the control signal generator 206 may not generate a separate control signal or may generate a control signal to continuously rotate the motor 111 at the second rotation speed R2, and transmit the generated control signal to the motor 111.

Meanwhile, the time determination unit 203 may determine whether the counted time exceeds the second reference period RT2 by continuously counting time even after the second limit period LT2. After the elapse of the second reference period RT2, the time determination unit 203 may transmit information indicating the elapse of the second reference period RT2 to the average calculator 204. After transmitting information indicating the elapse of the second reference period RT2 to the average calculator 204, the time determination unit 203 resets the time count value related to determination of the second reference period RT2 and restart counting of time to determine the elapse of the second reference period RT2. According to an embodiment, after transmitting information indicating the elapse of the second reference period RT2, the time determination unit 203 may reset the time count value related to the second limit period LT2 and start counting of time to determine the elapse of the second limit period LT2.

If the average MP22 is greater than the second reference value P2, the average calculator 204 may re-calculate the second average MP23 or MP24 of power levels P20 to P27 of the feedback current during the second reference period RT2 upon receiving the information indicating the elapse of the second reference period RT2 from the time determination unit 203.

The comparator 205 may compare the second average MP23 or MP24 of power levels P20 to P27 of the feedback current during the second reference period RT2 with the second reference value P2 obtained from the storage unit 300 and transmit a comparison result to the control signal generator 206.

If the second average MP23 is less than the second reference value P2 as illustrated in FIG. 14, the control signal generator 206 may determine the rotation speed of the motor 111 as the second rotation speed R2, generate a control signal corresponding thereto, and transmit the generated control signal to the motor 111 of the compressor 110. Thus, the compressor 110 operates at the second rotation speed R2 (L23). When the compressor 110 operates at the second rotation speed R2, the compressor controller 200 may repeat the aforementioned process to re-determine the rotation speed of the motor 111 of the compressor 110.

Meanwhile, if the second average MP24 is greater than the second reference value P2, the control signal generator 206 may determine the rotation speed of the motor 111 as the third rotation speed R3, generate a control signal corresponding thereto, and transmit the generated control signal to the motor 111 of the compressor 110. Accordingly, the compressor 110 operates at the third rotation speed R3 (L22).

If the rotation speed of the motor 111 of the compressor 110 increases too fast, the pressure of the refrigerant may exceed a prescribed range, resulting in deterioration of lifespan of the compressor. If the compressor 110 operates at a relatively lower rotation speed, i.e., at the second rotation speed, for a long period of time by setting the second reference period to be longer than the second limit period as described above, deterioration of lifespan of the parts of the compressor 110 may be inhibited.

Figure 15:
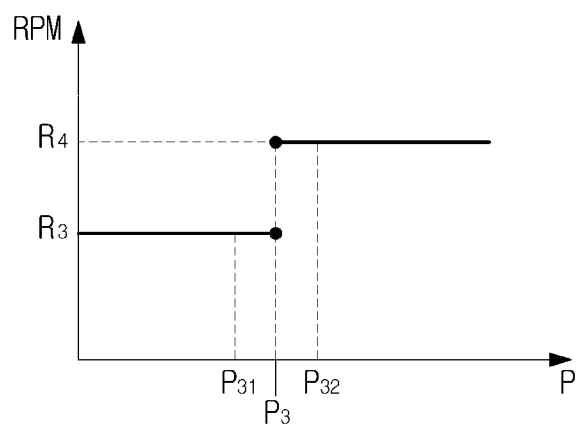
FIG. 15 is a graph for describing a method of determining a rotation speed of the compressor based on a calculation result of a third average.
Figure 16:
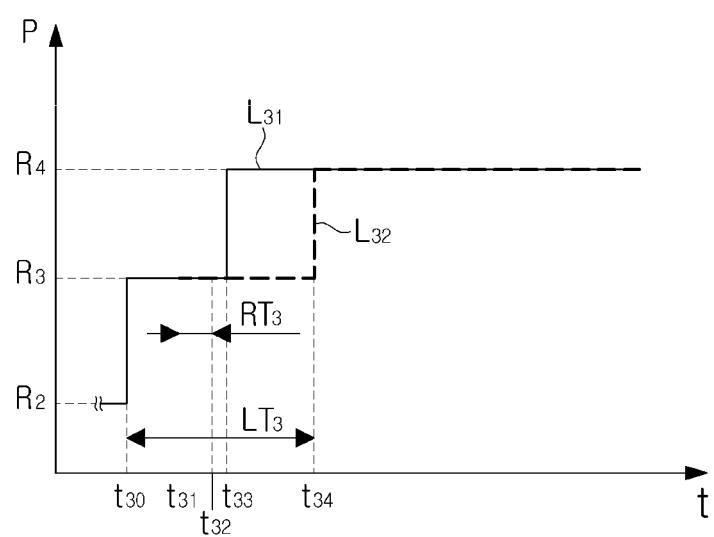
FIG. 16 is a graph for describing a method of changing the rotation speed of the compressor based on the third average and a third limit period.

FIG. 15 is a graph for describing a method of determining a rotation speed of the compressor based on a calculation result of a third average. FIG. 16 is a graph for describing a method of changing the rotation speed of the compressor based on the third average and a third limit period.

If the compressor 110 operates at the third rotation speed R3 (L12 and L21) as described above, the signal level acquisition unit 202 periodically store levels of the feedback current, e.g., power of the feedback current, received from the compressor 110, and the time determination unit 203 counts time and determines whether the counted time is the same or exceeds the third reference period KT3. The average calculator 204 calculates a third average MP31 or MP32 of power levels of the feedback current during the third reference period KT3 in accordance with the electric signal received from the time determination unit 203, and the comparator 205 compares the third average MP31 or MP32 with the third reference value P3 and transmit a comparison result to the control signal generator 206.

If the calculated third average MP31 is less than the third reference value P3 as illustrated in FIGS. 15 and 16, the control signal generator 206 determines the rotation speed of the motor 111 as the third rotation speed R3, generates a control signal corresponding thereto, and transmits the generated control signal to the compressor 110. If the calculated third average MP32 is greater than the third reference value P3, the control signal generator 206 may determine the rotation speed of the motor 111 as the fourth rotation speed R4 greater than the third rotation speed R3. As the control signal generator 206 generates the control signal corresponding to the determination result and transmit the generated control signal to the compressor 110, the compressor 110 may operate at the fourth rotation speed R4 (L31). In this case, a time point t33 at which the motor 111 starts rotation at the fourth rotation speed R4 may be the same as or later than a time point t32 at which the third average MP31 or MP32 is calculated.

As described above, the time determination unit 203 may count a period of time from a time point t30 at which the compressor 110 starts operation at the third rotation speed R3. If the counted time (t34−t30) is the same as or exceeds the third limit period LT3, the time determination unit 203 may transmit information indicating the elapse of the third limit period LT3 to the control signal generator 206. In this case, the third limit period LT3 may be set to be longer than the third reference period RT3 as illustrated in FIG. 16. Upon receiving the information indicating the elapse of the third limit period LT3, the control signal generator 206 may determine the rotation speed of the motor 111 as the fourth rotation speed R4, generate a control signal corresponding thereto, and transmit the generated control signal to the compressor 110. Thus, the compressor 110 may operate at the fourth rotation speed R4 (L32).

An example of controlling the compressor 110 when the first reference period KT1 is shorter than the first limit period LT1, the second reference period KT2 is longer than the second limit period LT2, and the third reference period KT3 is shorter than the third limit period LT3 has been described. However, methods of controlling the compressor 110 are not limited thereto. According to an embodiment, the first reference period KT1 may be set to be longer than the first limit period LT1, the second reference period KT2 may be set to be shorter than the second limit period LT2, and/or the third reference period KT3 may be set to be longer than the third limit period LT3. If the first reference period KT1 is set to be longer than the first limit period LT1 and/or the third reference period KT3 is set to be longer than the third limit period LT3, the compressor operating at the first rotation speed and/or at the third rotation speed may be controlled by using the aforementioned process as that of controlling the compressor operating at the second rotation speed or using a modified process. Also, when the second reference period KT2 is set to be shorter than the second limit period LT2, the compressor operating at the second rotation speed may be controlled by using the aforementioned process as that of controlling the compressor operating at the first rotation speed and/or at the third rotation speed or by using a modified method. Besides, the compressor 110 may be controlled in accordance with the first to fourth rotation speeds R1 to R4 by using various other methods selected by the designer.

Figure 17:
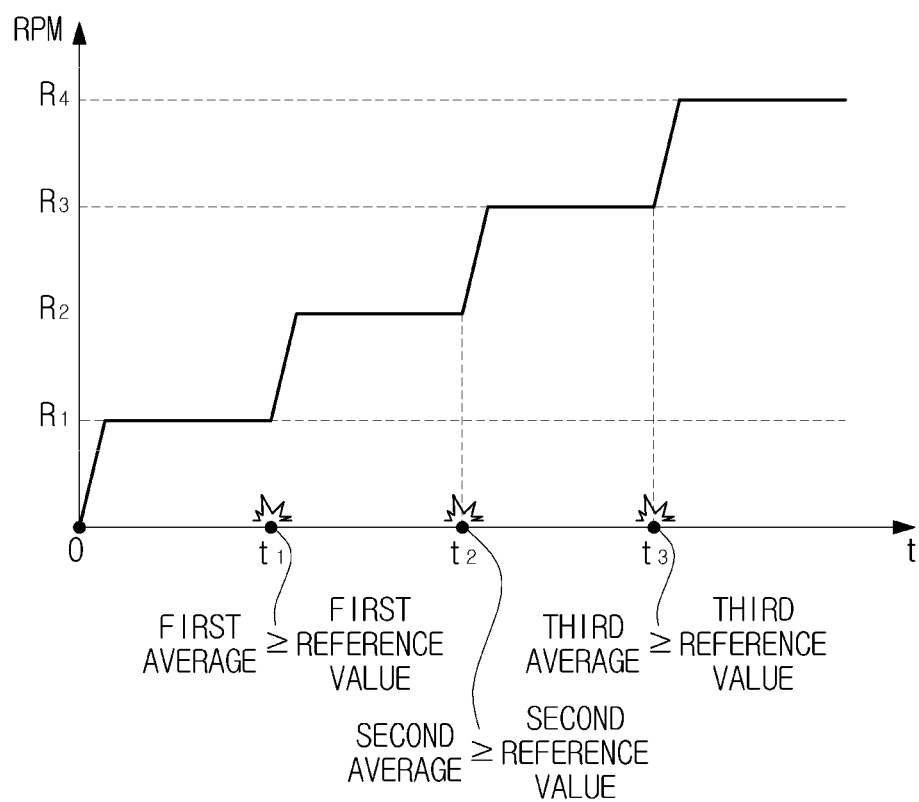
FIG. 17 is a first graph for exemplarily describing a stepwise increase in the rotation speed of the compressor.
Figure 18:
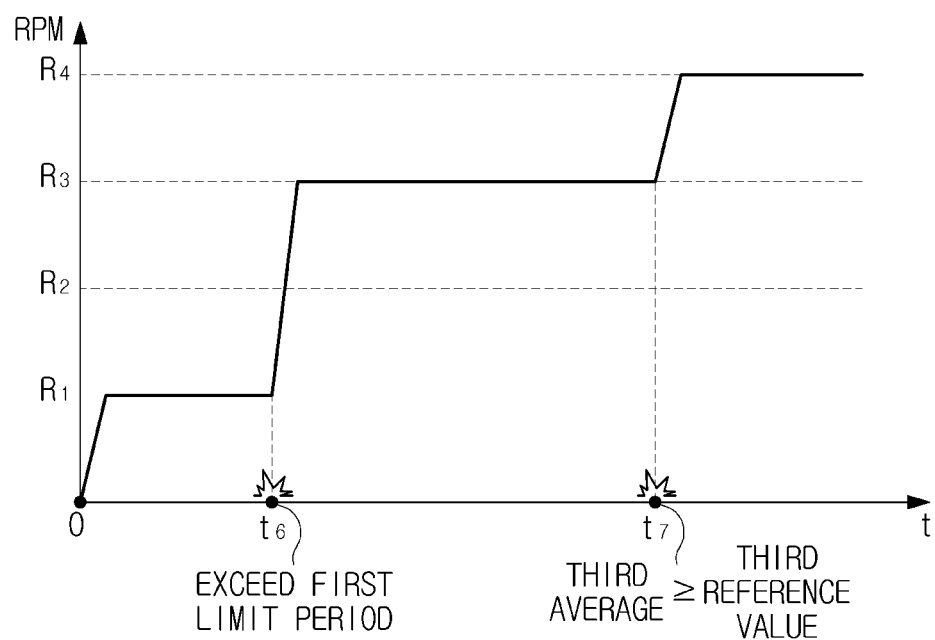
FIG. 18 is a second graph for exemplarily describing the stepwise increase in the rotation speed of the compressor.

FIG. 17 is a first graph for exemplarily describing a stepwise increase in the rotation speed of the compressor. FIG. 18 is a second graph for exemplarily describing the stepwise increase in the rotation speed of the compressor.

The motor 111 of the compressor 110 may operate at a rotation speed changing in a stepwise manner under the control as described above. For example, if each of the first average, the second average, and the third average of power levels of the feedback current is the same as or greater than each of the first reference value P1, the second reference value P2, and the third reference value P3 at each of the time points t1, t2, and t3 as illustrated in FIG. 17, the rotation speed of the motor 111 increases at every time points t1, t2, and t3. Thus, the rotation speed of the motor 111 increases from the first rotation speed R1 to the fourth rotation speed R4 in a stepwise manner. Even when an overload is applied to the motor 111, the compressor 110 may be efficiently and safely controlled.

Also, as illustrated in FIG. 18, even when the first average is less than the first reference value, the rotation speed of the compressor 110 may be changed. If the compressor 110 operates for longer than a given period of time, e.g., for longer than the first limit period, the compressor 110 may operate at a relatively higher rotation speed, e.g., at the third rotation speed R3 at a time point t6 exceeding the first limit period or after a delay time from the first limit period. Therefore, decrease in the cooling rate of the refrigerator 10 caused by driving the compressor 110 at a low rotation speed for a long time may be prevented. In this case, even when the second rotation speed R2 is skipped and the rotation speed of the compressor 110 is increased directly to the third rotation speed R3, the third average may be calculated as described above. If the third average obtained at a given time point t7 is greater than the third reference value, the compressor 110 may start rotation at the fourth rotation speed R4 under the control of the compressor controller 200.

FIGS. 17 and 18 exemplarily illustrate changes in the rotation speed of the motor 111 of the compressor 110 from the first rotation speed R1 to the fourth rotation speed R4. Under the control as described above, the rotation speed of the motor 111 may vary in various manners from the first rotation speed R1 to the fourth rotation speed R4.

Although FIGS. 8 to 18 exemplarily illustrate increases in the rotation speed of the motor 111 with time from the first rotation speed R1 to the fourth rotation speed R4, the rotation speed of the motor 111 may also decrease from the fourth rotation speed R4 to the first rotation speed R1 opposite to the cases illustrated in FIGS. 8 to 18. In this case, the motor 111 operates at the fourth rotation speed R4 when the electric signal is transmitted to the compressor controller 200 upon conduction of the thermostat 181. The rotation speed of the motor 111 may decrease from the fourth rotation speed R4 to the first rotation speed R1 in a stepwise manner depending on the comparison result between the first to third averages and the first to third reference values and/or the elapse of the first to third limit periods as described above.

Figure 19:
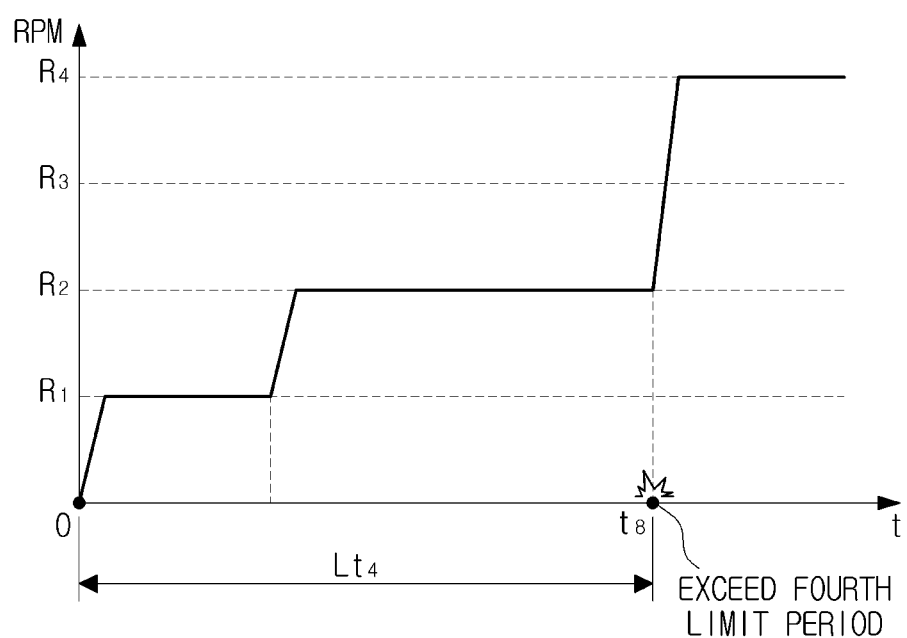
FIG. 19 is a graph for describing a method of changing the rotation speed of the compressor after the elapse of the fourth limit period.

FIG. 19 is a graph for describing a method of changing the rotation speed of the compressor after the elapse of the fourth limit period.

According to an embodiment, the time determination unit 203 may count a period of time from a time point at which the compressor 110 starts operation in accordance with the control signal received from the compressor controller 200. For example, the time determination unit 203 may continuously count a period of time from the time point at which the compressor 110 starts operation at the first rotation speed R1 upon conduction of the thermostat 181. If the counted time is the same or exceeds the fourth limit period LT4 obtained from the storage unit 300, the time determination unit 203 may transmit information indicating the elapse of the fourth limit period LT4 to the control signal generator 206. Upon receiving the information indicating the elapse of the fourth limit period LT4, the control signal generator 206 may immediately generate a control signal to control the compressor 110 to operate at the fourth rotation speed R4 and transmit the generated control signal to the compressor 110. Accordingly, the compressor 110 operates at the fourth rotation speed R4. In this case, even while the compressor 110 is currently operating at a rotation speed controlled sequentially or stepwise from the first rotation speed R1 to the third rotation speed R3 as described above, the control signal generator 206 may ignore the control process performed before the fourth limit period LT4 is received and control the motor 111 of the compressor 110 to operate at the fourth rotation speed R4 immediately after the counted time reaches the fourth limit period LT4. If the rotation speed of the motor 111 is controlled sequentially or stepwise as described above, it may take a long time from the first rotation speed R1 to the fourth rotation speed R4 depending on the situation so that the cooling rate of the refrigerator 10 may decrease. Particularly, when temperature of the storage compartment 20 of the refrigerator 10 is high, the storage compartment 20 needs to be cooled quickly. Thus, after the elapse of the fourth limit period LT4, e.g., 3 hours, the rotation speed of the motor 111 may be increased to the fourth rotation speed R4 to prevent decrease in the cooling rate of the refrigerator 10.

Figure 20:
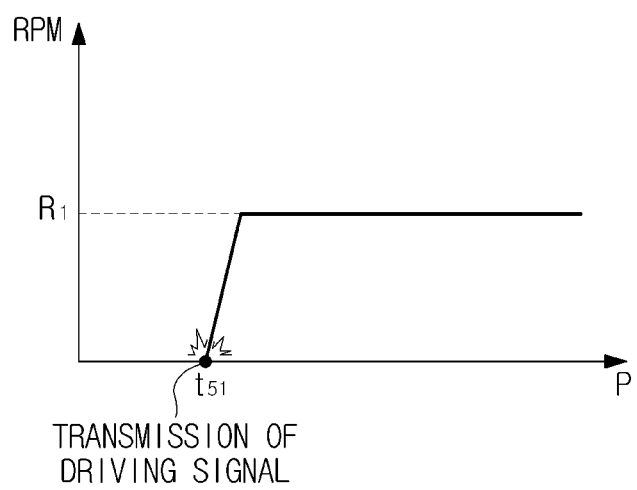
FIG. 20 is a first graph for exemplarily describing operation of the compressor in accordance with a driving signal.
Figure 21:
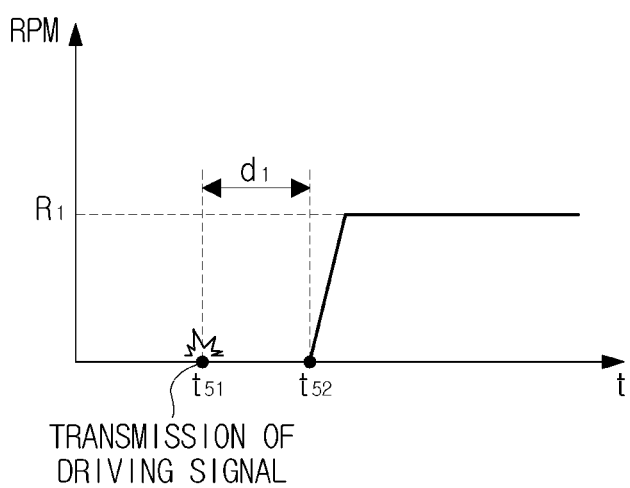
FIG. 21 is a second graph for exemplarily describing the operation of the compressor in accordance with the driving signal.

FIG. 20 is a first graph for exemplarily describing operation of the compressor in accordance with a driving signal. FIG. 21 is a second graph for exemplarily describing the operation of the compressor in accordance with the driving signal.

According to an embodiment, referring to FIG. 20, when the compressor controller 200 receives an electric signal, i.e., a driving signal, in accordance with conduction of the thermostat 181 and/or a sensing result of the temperature sensor, the compressor 110 may start operation at a time point t51 at which the driving signal is received. In other words, the compressor 110 may immediately start operation when the temperature of the storage compartment 20 is below a given level in accordance with conduction of the thermostat 181 and/or the sensing result of the temperature sensor. In this case, the compressor 110 may operate at a predetermined rotation speed, e.g., at the first rotation speed R1.

According to another embodiment, referring to FIG. 21, upon receiving the driving signal in accordance with conduction of the thermostat 181 and/or the sensing result of the temperature sensor, the compressor 110 may start operation at a time point t52 at a predetermined rotation speed, e.g., at the first rotation speed R1, after a delay time d1 from the time point t51 at which the compressor 110 receives the driving signal without starting operation at the time point t51. If power supply to the refrigerator 10 is stopped and restarted, the compressor 110 may not normally operate due to a large pressure difference of the refrigerant between the condenser refrigerant inlet 119 and the compressor refrigerant inlet 149 connected to the compressor 110. In this case, the pressure different of the refrigerant between the condenser refrigerant inlet 119 and the compressor refrigerant inlet 149 may decrease by driving the compressor 110 after the delay time d1 as described above, so that the compressor 110 may operate normally. Here, the delay time d1 may be set to 10 seconds. However, the delay time d1 is not limited thereto and modified in various manners by the designer.

Figure 22:
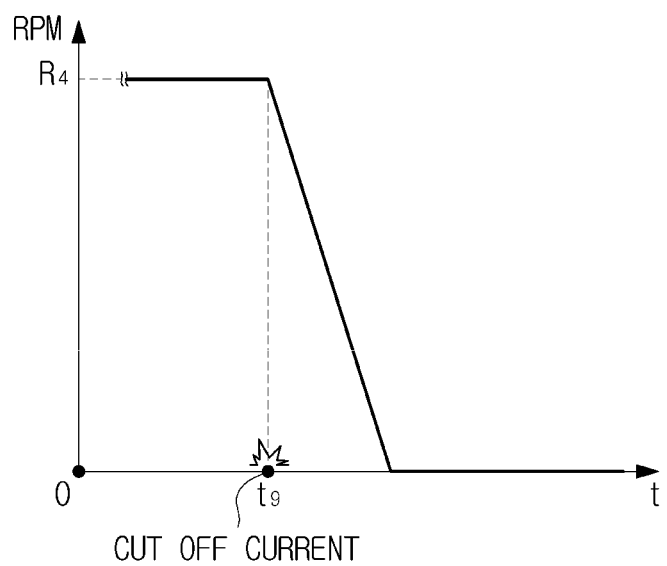
FIG. 22 is a graph for exemplarily describing a method of stopping operation of the compressor.

FIG. 22 is a graph for exemplarily describing a method of stopping operation of the compressor.

When the internal temperature of the storage compartment 20 is sufficiently low, the thermostat 181 opens the switch in accordance with operation of the bi-metal, and the driving signal is no longer received. According to an embodiment, when the driving signal is no longer received, current supply to the compressor 110 may also be stopped at a time point t9. Thus, the motor 111 of the compressor 110 rotating at a predetermined rotation speed, e.g., at the fourth rotation speed R4, may stop operation. As operation of the motor 111 stops, the refrigerant is not actively transferred from the compressor 110 to the condenser 120, and the cooling cycle caused by the flow of the refrigerant is stopped. According to another embodiment, when receiving of the driving signal stops, the compressor controller 200 may transmit a control signal to stop operation to the compressor 110, so that the compressor 110 may stop operation in response to the control signal. Thus, the cooling cycle is stopped.

Also, the compressor 110 may stop operation in accordance with the elapse of time according to an embodiment. For example, if a given time has elapsed since the compressor 110 started an operation, the compressor 110 may stop operation. In this case, the compressor 110 may stop operation in accordance with a control signal of the compressor controller 200. The compressor controller 200 may count a period of time after the compressor 110 starts operation by using the clock 210 and transmit a control signal to stop operation to the compressor 110 in accordance with a counting result. Thus, the compressor 110 stops operation.

Figure 23:
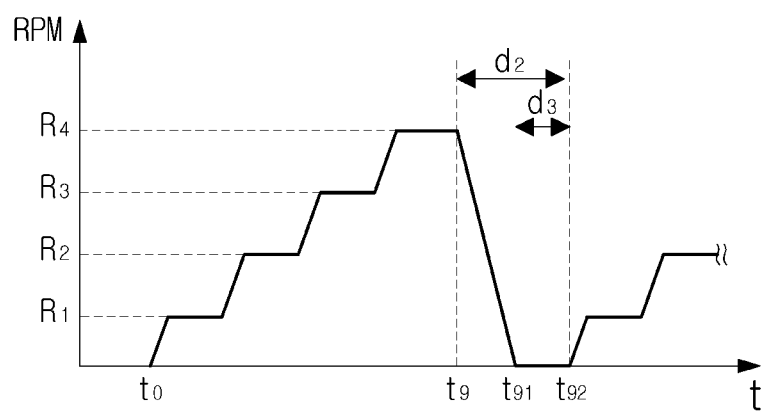
FIG. 23 is a graph for exemplarily describing operation of the compressor with time.

FIG. 23 is a graph for exemplarily describing operation of the compressor with time.

According to an embodiment, the compressor 110 may start operation based on the sensing result of the temperature sensor and/or the driving signal received by the thermostat 181 as described above. According to another embodiment, the compressor 110 may restart operation at a time point t92 after given periods of time d2 and d3 respectively from time points t9 and t91 at which the compressor 110 stops operation as illustrated in FIG. 23.

Particularly, the time determination unit 203 of the compressor controller 200 may count a period of time from the time points t9 and t91 at which the compressor 110 stops operation. After the given periods of time d2 and d3, the time determination unit 203 may transmit information indicating the elapse of the given periods of time d2 and d3 to the control signal generator 206. The control signal generator 206 may generate a control signal for the compressor 110 based on the received information and transmit the generated control signal to the compressor 110. The compressor 110 may rotate at a predetermined rotation speed, e.g., at the first rotation speed R1, in accordance with the received control signal. After operation of the compressor 110 is started, the motor 111 of the compressor 110 may operate at the rotation speed varying in a stepwise manner under the control of the compressor controller 200 as described above.

Here, the time points t9 and t91 at which the compressor 110 stops operation may be the time point t9 at which receiving of the driving signal stops or the time point t91 at which the compressor 110 completely or almost stops operation after receiving of the driving signal stops.

The time points t9 and t91 at which the compressor 110 stops operation or the given periods of time d2 and d3 may be defined and set in various manners by the designer or set or modified via the user interface 400 controlled by a user.

Figure 24:
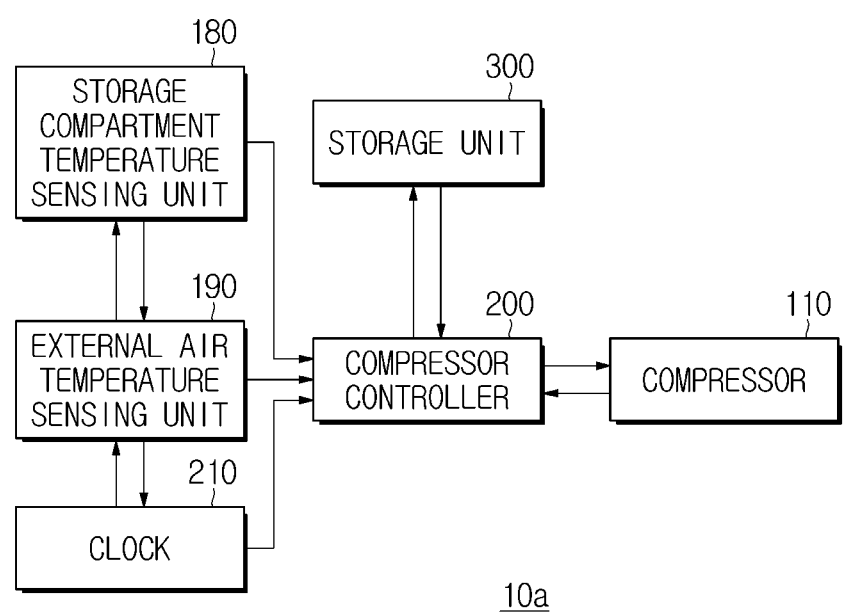
FIG. 24 is a control block diagram illustrating a refrigerator including an external air temperature sensing unit.
Figure 25:
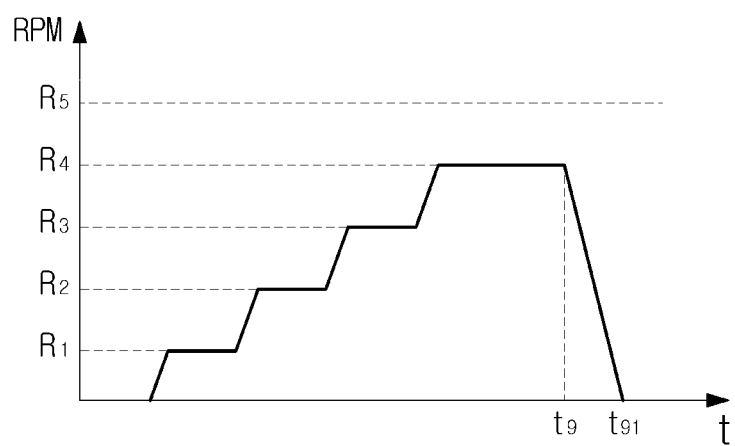
FIG. 25 is a graph for describing operation of the compressor when a temperature of external air is at or below a predetermined temperature.
Figure 26:
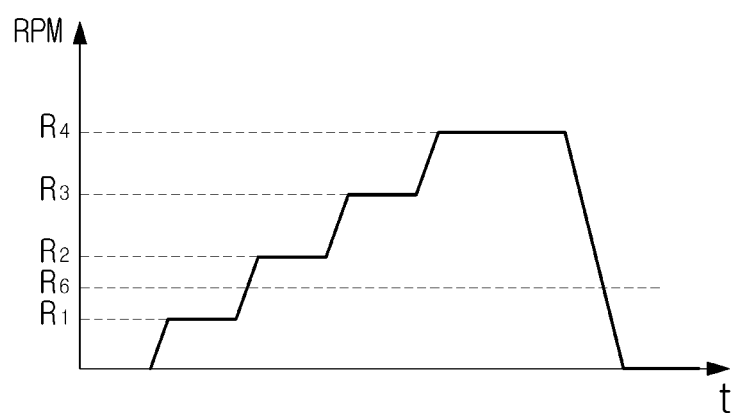
FIG. 26 is a graph for describing operation of the compressor when the temperature of the external air is higher than a predetermined temperature.

FIG. 24 is a control block diagram illustrating a refrigerator including an external air temperature sensing unit. FIG. 25 is a graph for describing operation of the compressor when a temperature of external air is at or below a predetermined temperature. FIG. 26 is a graph for describing operation of the compressor when the temperature of the external air is higher than a predetermined temperature.

Referring to FIG. 24, a refrigerator 10a according to another embodiment includes a compressor 110 configured to circulate a refrigerant in accordance with rotation of a motor 111, a storage compartment temperature sensing unit 180 configured to sense internal temperature of a storage compartment 20, a compressor controller 200 configured to control operation of the compressor 110, a clock 210 configured to measure time and transmit a measurement result to the compressor controller 200, a storage unit 300 configured to store various information required for operation of the compressor controller 200, such as a reference period 310, a reference value 320, a rotation speed 330, and/or a limit period 340, and an external air temperature sensing unit 190.

The compressor 110, the storage compartment temperature sensing unit 180, the compressor controller 200, the clock 210, and the storage unit 300 are as described above, and thus descriptions thereof will not be repeated.

The external air temperature sensing unit 190 may sense temperature of ambient air outside the refrigerator 10a. The external air temperature sensing unit 190 may be installed at one portion of the housing 11 (FIG. 1) or the door 20 of the refrigerator 10a. For example, the external air temperature sensing unit 190 may be installed at the top surface 11e of the housing 11 or at the rear surface 11d or side surfaces 11b and 11c as illustrated in FIG. 1. Besides, the external air temperature sensing unit 190 may also be installed at any other positions selected by the designer.

According to an embodiment, the external air temperature sensing unit 190 may sense temperature of external air by using a change in electric resistance or using temperature characteristics of a diode or transistor, or superconductivity. Besides, the external air temperature sensing unit 190 may sense and measure temperature of external air. The external air temperature sensing unit 190 may sense temperature of external air, output a sensing result, and transmit the output sensing result to the compressor controller 200 via a circuit or wire.

The compressor controller 200 may control operation of the compressor 110 in accordance with the temperature of the external air.

According to an embodiment, referring to FIGS. 25 and 26, the compressor controller 200 may control the motor 111 of the compressor 110 to rotate at or below one predetermined rotation speed, e.g., a fifth rotation speed R5, and/or at or above another predetermined rotation speed, e.g., a sixth rotation speed R6, in accordance with the temperature of the external air.

For example, if the temperature of the external air is lower than a preset first temperature, the compressor controller 200 may control the motor 111 of the compressor 110 to operate at or below the fifth rotation speed R5 as illustrated in FIG. 25. In other words, the compressor controller 200 may control a maximum rotation speed of the motor 111 at or below the fifth rotation speed R5 when the rotation speed of the motor 111 varies in a stepwise manner.

In this case, at least one of the preset first temperature and the fifth rotation speed R5 may be set by one of the designer and the user. For example, the preset first temperature may be 33 degrees, and the fifth rotation speed R5 may be 3000 rpm. However, the preset first temperature and the fifth rotation speed R5 are only examples and may also be modified in various manners by the designer or the user.

According to another embodiment, if the temperature of the external air is higher than a preset second temperature, the compressor controller 200 may control the motor 111 of the compressor 110 to operate at or above the sixth rotation speed R6 as illustrated in FIG. 26. In other words, the compressor controller 200 may control the rotation speed of the motor 111 to be greater than the sixth rotation speed R6 when the rotation speed of the motor 111 varies in a stepwise manner. According to an embodiment, the compressor controller 200 may control the rotation speed such that the changed rotation speed, e.g., the second rotation speed R2 to the fourth rotation speed R4, from the rotation speed of initial operation, e.g., the first rotation speed R1, may be higher than the sixth rotation speed R6 as illustrated in FIG. 26. In other words, the first rotation speed R1 may be lower than the sixth rotation speed R6, and the other rotation speeds R2 to R4 may be higher than the sixth rotation speed R6.

Here, the second temperature may be preset by one of the designer and the user. The preset second temperature may be the same as or different from the first temperature. For example, the second temperature may be 33 degrees. The sixth rotation speed R6 may also be determined by at least one of the designer and the user. For example, the sixth rotation speed R6 may be 2000 rpm. However, these second temperature and sixth rotation speed R6 are only examples and may also be modified in various manners by the designer or the user.

According to another embodiment, the control signal generator 206 of the compressor controller 200 may transmit an electric signal to the storage unit 300 to set the first to fourth rotation speeds R1 to R4 stored in the storage unit 300 to be lower than one predetermined rotation speed, e.g., the fifth rotation speed R5, and/or to be higher than another predetermined rotation speed, e.g., the sixth rotation speed R6.

Particularly, if the temperature of the external air is lower than the preset first temperature, the compressor controller 200 may transmit the electric signal to the storage unit 300 such that the first to fourth rotation speeds R1 to R4 are lower than the fifth rotation speed R5. In other words, the fourth rotation speed R4, the maximum rotation speed of the motor 111, is corrected to be lower than the fifth rotation speed R5 and stored in the storage unit 300. In this case, if the first to fourth rotation speeds R1 to R4 are lower than the fifth rotation speed R5, the first to fourth rotation speeds R1 to R4 stored in the storage unit 300 may not be corrected.

In the same manner, if the temperature of the external air is lower than the preset second temperature, the compressor controller 200 may determine whether the second to fourth rotation speeds R2 to R4 are higher than the sixth rotation speed R6. If the second to fourth rotation speeds R2 to R4 are lower than the sixth rotation speed R6, the second to fourth rotation speeds R2 to R4 stored in the storage unit 300 may be corrected to be higher than the sixth rotation speed R6. If the second to fourth rotation speeds R2 to R4 are higher than the sixth rotation speed R6, the compressor controller 200 does not generate a control signal for data correction, and accordingly the second to fourth rotation speeds R2 to R4 stored in the storage unit 300 are not corrected but maintained. According to an embodiment, the compressor controller 200 may also control the first rotation speed R1 to be higher than the sixth rotation speed R6 by maintaining or changing the rotation speed of the initial operation of the motor 111, e.g., the first rotation speed R1.

If the first to fourth rotation speeds R1 to R4 stored in the storage unit 300 are maintained or changed as described above, the compressor controller 200 controls the motor 111 of the compressor 110 in accordance with the maintained or changed first to fourth rotation speeds R1 to R4. As a result, the motor 111 of the compressor 110 may operate at a rotation speed shorter than the fifth rotation speed R5 or at a rotation speed higher than the sixth rotation speed R6 in accordance with the temperature of the external air.

Embodiments of the refrigerators 10 and 10a including the compressor 110 have been described above. However, the aforementioned descriptions are not limited to the refrigerators 10 and 10a. These embodiments may also be applied to various apparatuses in which a refrigerant is circulated by a compressor to cool or heat air inside and/or outside the apparatuses in a partially modified manner or in the same manner. For example, the compressor 110 and the compressor controller 200 may also be applied to a compressor or a controller provided in air conditioners in the same manner or in a modified manner.

Hereinafter, methods of controlling a refrigerator according to embodiments will be described with reference to FIGS. 27 to 33.

Figure 27:
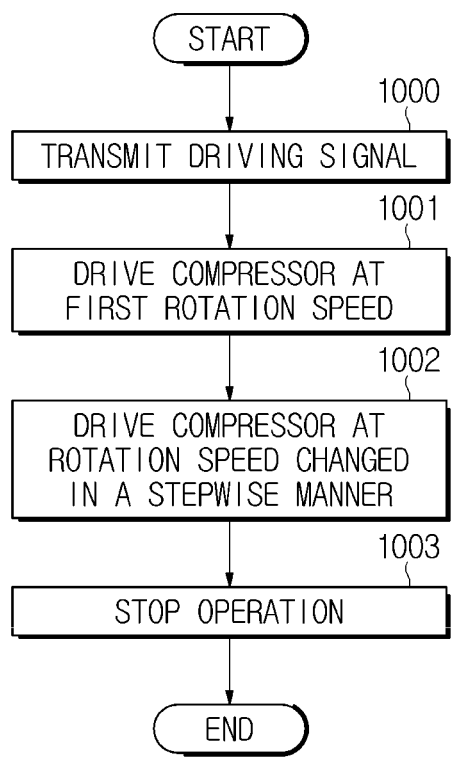
FIG. 27 is a flowchart for describing a method of controlling a refrigerator according to an embodiment.

FIG. 27 is a flowchart for describing a method of controlling a refrigerator according to an embodiment.

According to the method of controlling a refrigerator illustrated in FIG. 27, a driving signal output from the storage compartment temperature sensing unit or a control signal of the compressor controller is transmitted to the compressor (1000). In this case, the compressor may include an inverter compressor. Also, the storage compartment temperature sensing unit may include a thermostat or a temperature sensor.

Upon receiving the driving signal or the control signal, the motor of the compressor may start rotation at an initial rotation speed, e.g., the first rotation speed, in response to the driving signal or the control signal (1001). In this case, the first rotation speed may be determined by the compressor controller. According to an embodiment, the compressor controller of the refrigerator may obtain information about the first rotation speed stored in a separate storage unit and control the motor to operate at the first rotation speed based on the obtained information about the first rotation speed.

According to another embodiment, the compressor may start operation after a given period of time from termination of previous operation of the compressor. When the compressor starts operation, the motor of the compressor rotates at the first rotation speed as described above.

After the compressor starts operation at the first rotation speed, the compressor controller may control the compressor to operate at a rotation speed varying a stepwise manner by acquiring levels of electric signals applied to the compressor, calculating an average of the acquired electric signals, and determining a rotation speed of the compressor in accordance with the calculated average (1002). In this case, the compressor controller may measure the levels of the electric signals applied to the motor of the compressor directly or by using a feedback current. According to an embodiment, the levels of the electric signals applied to the motor of the compressor may include a level of at least one of voltage, current, and power. In addition, the compressor controller may determine the rotation speed of the compressor based on an operating time of the compressor at a predetermined rotation speed or based on an entire operating time and control the compressor based on the determined rotation speed of the compressor. Thus, the compressor may operate at the rotation speed varying in a stepwise manner.

Later, the motor of the compressor may stop operation (1003). The motor may stop operation in response to at least one of the elapse of time, an end of receiving the driving signal output from the storage compartment temperature sensing unit, and a receipt of a control signal to stop operation.

Hereinafter, an exemplary embodiment of operation of the compressor based on a stepwise change in rotation speed will be described.

Figure 28:
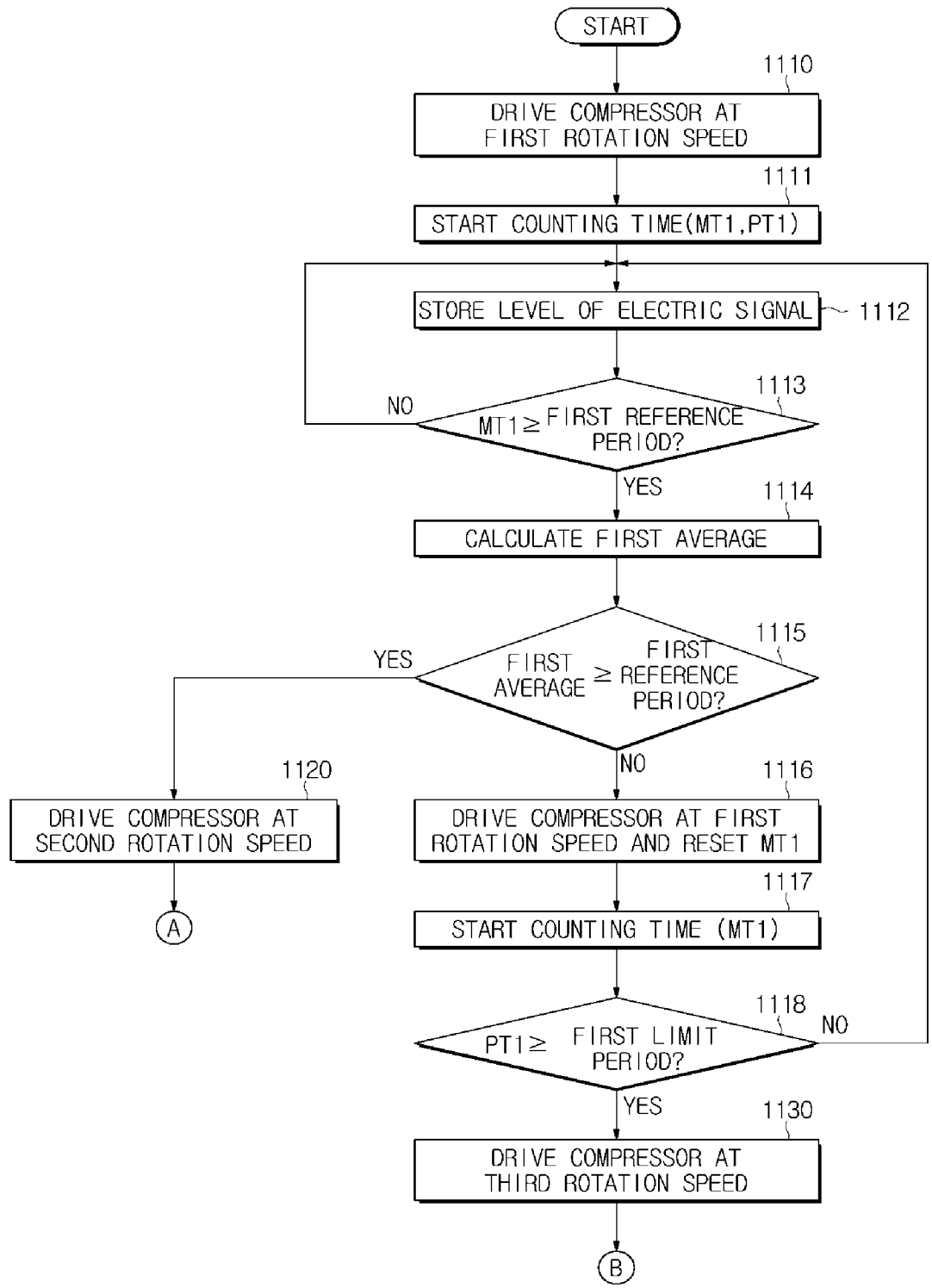
FIG. 28 is a first flowchart for describing a method of controlling the refrigerator in detail.
Figure 29:
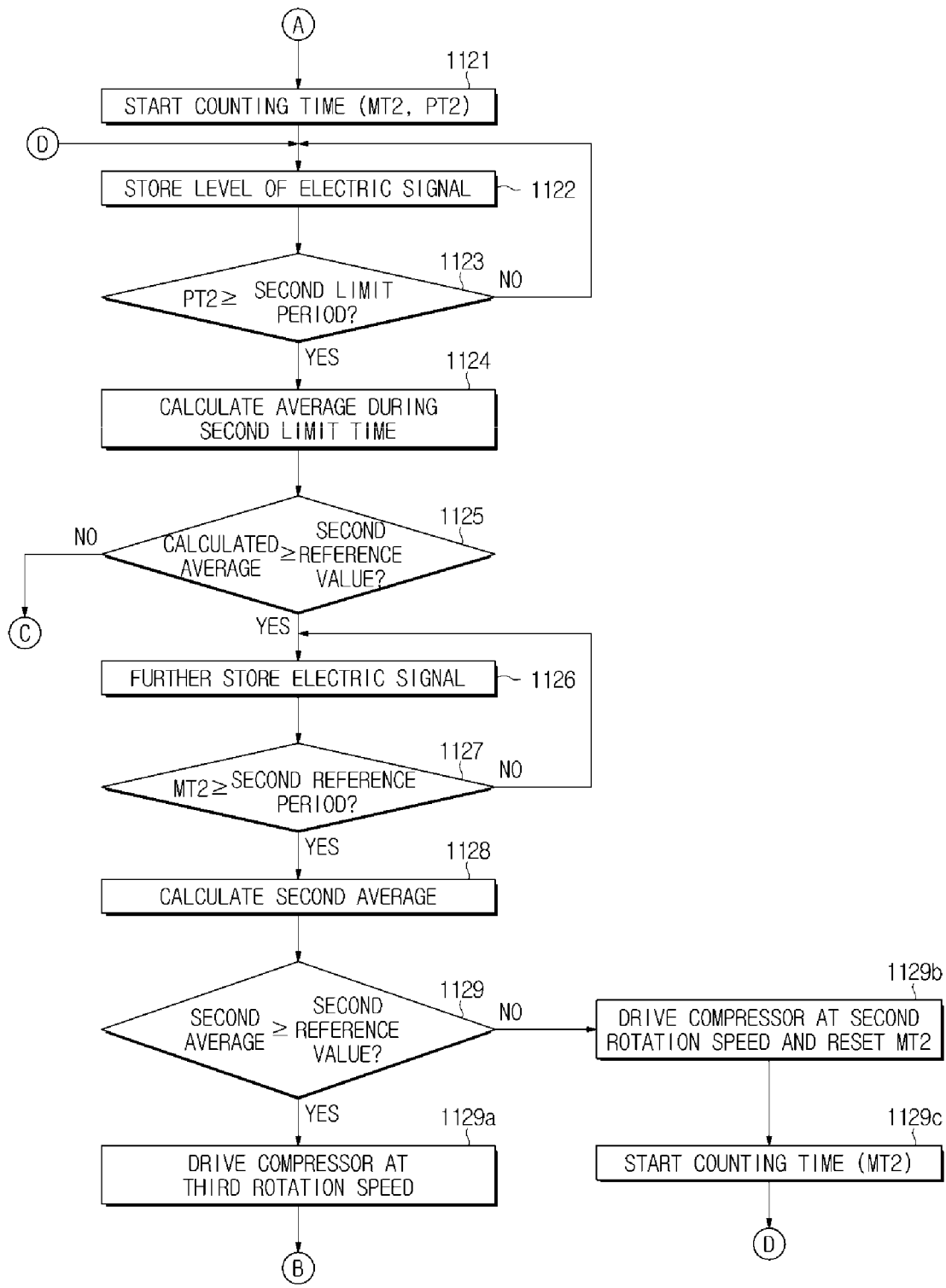
FIG. 29 is a second flowchart for describing the method of controlling the refrigerator in detail.
Figure 30:
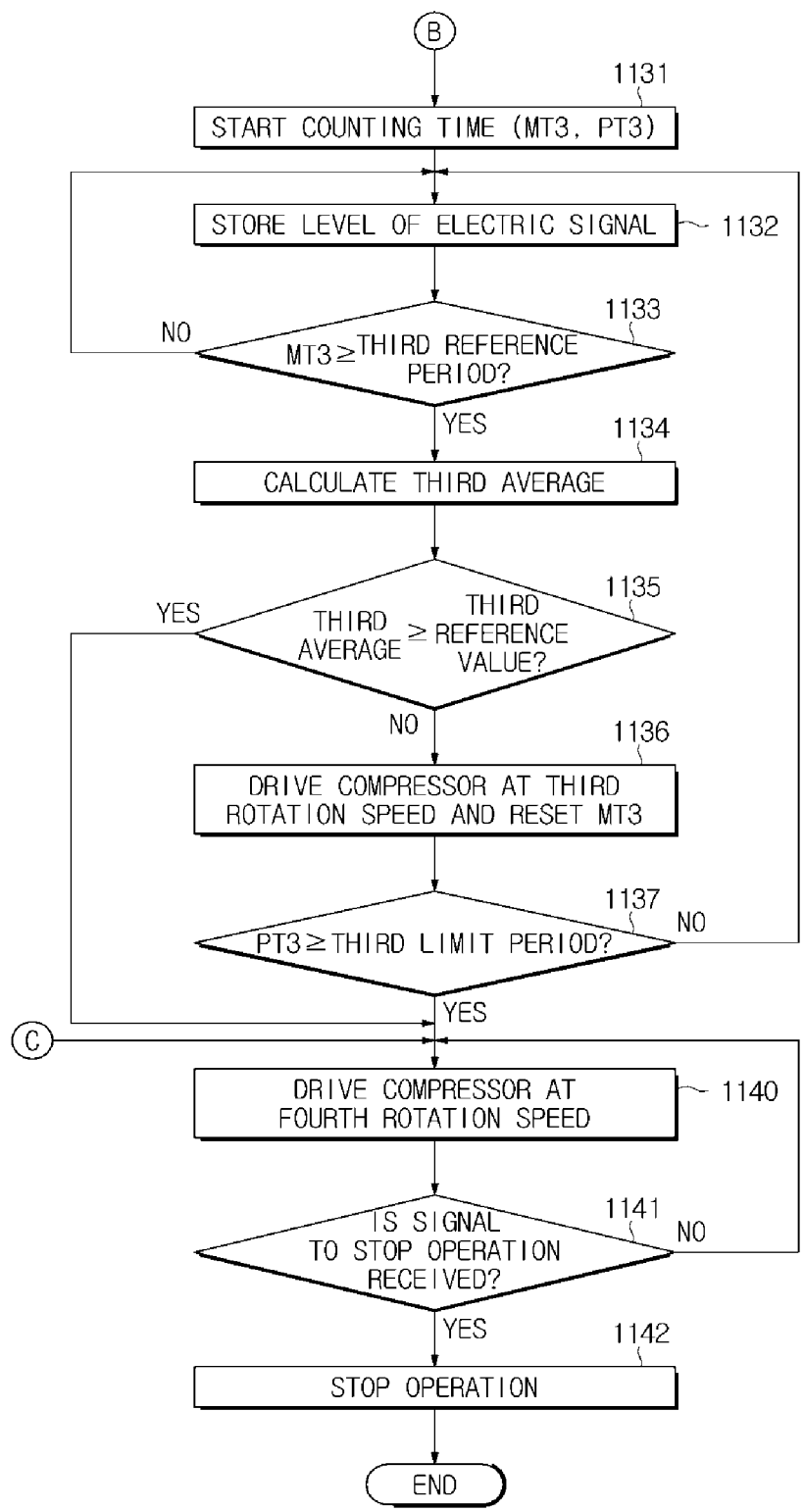
FIG. 30 is a third flowchart for describing the method of controlling the refrigerator in detail.

FIG. 28 is a first flowchart for describing a method of controlling the refrigerator in detail. FIG. 29 is a second flowchart for describing the method of controlling the refrigerator in detail. FIG. 30 is a third flowchart for describing the method of controlling the refrigerator in detail.

According to the method of controlling a refrigerator as illustrated in FIG. 28, when the compressor starts operation at the first rotation speed (1110), the refrigerator starts to count time (1111). In this case, the refrigerator may count a time by using two variables MT1 and PT1. A first variable MT1 is a variable used to determine the elapse of the first reference period, and a second variable PT1 is a variable used to determine the elapse of the first limit period. The refrigerator may determine the elapse of the first reference period or the first limit period by increasing the first variable MT1 and the second variable PT1 with time.

Also, when the compressor starts operation at the first rotation speed (1110), the refrigerator may store the levels of the electric signals applied to the compressor (1112). Here, the levels of the electric signals may include a level of at least one of voltage, current, and power. The refrigerator stores the levels of the electric signals applied to the compressor periodically or non-periodically. The levels of the electric signals may be stored after the counting of time is started (1111) as illustrated in FIG. 28, at the same time as the counting of time (1111), or before the counting of time (1111).

If the first reference period is set to be shorter than the first limit period, the refrigerator compares the first variable MT1 with the first reference period (1113), first.

If the first variable MT1 is less than the first reference period (No of 1113), i.e., if the first reference period has not elapsed since the storing of the levels of the electric signals was started (1112), the refrigerator continues to store the levels of the electric signals applied to the compressor. On the contrary, if the first variable MT1 is the same or higher than the first reference period (Yes of 1113), the refrigerator may calculate a first average of the level of the electric signal, e.g., power of the electric signal, stored during the first reference period (1114). When the first average is calculated, the refrigerator compares the calculated first average with the first reference value obtained from the storage unit (1115).

As a result of comparison, if the first average is less than the first reference value (No of 1116), the rotation speed of the motor of the compressor is not changed, and the first rotation speed is maintained (1116). In other words, operation of the compressor may be performed at the initial rotation speed. Meanwhile, after the first reference period, the first variable MT1 is reset immediately or after a given period of time, and accordingly, the first variable MT1 may be set to 0. The refrigerator restarts counting of time by using the reset first variable MT1. Meanwhile, the counting of time may be continuously performed by using the second variable PT1 even while calculation and comparison of the first average are performed as described above.

After the rotation speed of the motor of the compressor is set not to be changed (1116), the refrigerator may compare the second variable PT1 with the first limit period at a given time point (1118). If the second variable PT1 is less than the first limit period (No of 1118), the refrigerator may repeat a process of continuously storing the levels of the electric signals applied to the compressor (1112), calculating the first average of the levels of the electric signals during the first reference period (1113 and 1114), comparing the first average with the first reference value, operating based on a comparison result (1115, 1116, and 1117).

On the contrary, if the second variable PT1 is the same as or higher than the first limit period (Yes of 1118), the compressor of the refrigerator operates at a changed rotation speed to the third rotation speed (1130). In this regard, the third rotation speed may be higher than the first rotation speed and a second rotation speed which will be described later. Accordingly, the motor of the compressor may rotate faster.

Meanwhile, as a result of comparison between the first average and the first reference value (1115), if the first average is the same or greater than the first reference value (Yes of 1115), the motor of the compressor may operate at the second rotation speed higher than the first rotation speed and lower than the third rotation speed.

Thus, the compressor may rotate at a relatively lower first rotation speed when a lower load is applied to the compressor and the compressor may operate at the second rotation speed higher than the first rotation speed when a higher load is applied to the compressor. Also, even while the lower of load is applied to the compressor, the rotation speed of the motor may be increased to the third rotation speed after the elapse of a predetermined period of time of driving the compressor, e.g., the elapse of the first limit period. As a result, the cooling rate may be increased.

Meanwhile, as illustrated in FIG. 29, when the motor of the compressor operates at the second rotation speed, the refrigerator may start counting of time in the same manner as described above (1121). In this case, the refrigerator may count a time by using a third variable MT2 and a fourth variable PT2. The third variable MT2 is a variable used to determine the elapse of the second reference period, and the fourth variable PT2 is a variable used to determine the elapse of the second limit period. The refrigerator may determine the elapse of the second reference period or the second limit period by increasing the third variable MT2 and the fourth variable PT2 with time.

When the compressor starts operation at the second rotation speed (1120), the refrigerator may store a level of the electric signal e.g., a level of at least one of voltage, current, and power, applied to the compressor, periodically or non-periodically (1122). The levels of the electric signals may be stored after the counting of time is started (1121) as illustrated in FIG. 29, at the same time as the counting of time (1121), or before the counting of time (1121).

If the second limit period is set to be shorter than the second reference period, the refrigerator compares the fourth variable PT2 with the second limit period, first (1123). Upon determination that the fourth variable PT2 is less than the second limit period as a result of comparison between the fourth variable PT2 and the second limit period, in other words, upon determination that the compressor starts operation at the second rotation speed and the second limit period has not elapsed (No of 1123), the refrigerator continuously store the electric signal (1122).

If the fourth variable PT2 is greater than the second limit period, in other words, if the second limit period has elapsed since the compressor started operation at the second rotation speed (Yes of 1123), the refrigerator calculates an average of the levels of the electric signals during the second limit period (1124).

Then, the refrigerator compares the average of the levels of the electric signals with the second reference value obtained from the storage unit during the second limit period (1125). If the calculated average is the same as or greater than the second reference value (Yes of 1125), the refrigerator continues to store the levels of the electric signals during the second reference period (1126). That is, the process of storing the levels of the electric signals started in operation 1122 is not stopped.

The refrigerator compares the third variable MT2 with the second reference period (1127). If the third variable MT2 is less than the second reference period (No of 1126), i.e., if the second reference period has not elapsed since the storing of the levels of the electric signals was started (1122), the refrigerator continues to store the levels of the electric signals during the second reference period (1126).

If the third variable MT2 is greater than the second reference period (Yes of 1126), i.e., if the second reference period has elapsed since the storing of the levels of the electric signals started (1122), the refrigerator calculates a second average that is an average of the levels of the electric signals during the second reference period (1128).

After calculating the second average, the refrigerator compares the second average with the second reference value obtained from the storage unit (1129). If the second average is greater than the second reference value (Yes of 1129), the compressor of the refrigerator starts operation at the third rotation speed higher than the second rotation speed (1129*a*).

On the contrary, if the second average is less than the second reference value (No of 1129), the compressor of the refrigerator continuously operates at the second rotation speed without changing the rotation speed (1129*b*). Meanwhile, after the elapse of the second reference period (Yes of 1127), the third variable MT2 may be reset immediately after the second reference period or at a predetermined time after the second reference period. In this case, the third variable MT2 may be set to 0.

When the third variable MT2 is reset, the refrigerator may restart counting of time used for comparison with the second reference period by using the third variable MT2 and the clock (1129) and repeat the process from Operations 1122 to 1129c.

Meanwhile, the fourth variable PT2 may be reset when the fourth variable PT2 exceeds the second limit period or when the third variable MT2 is reset, and the fourth variable PT2 may be set to 0.

Figure 31:
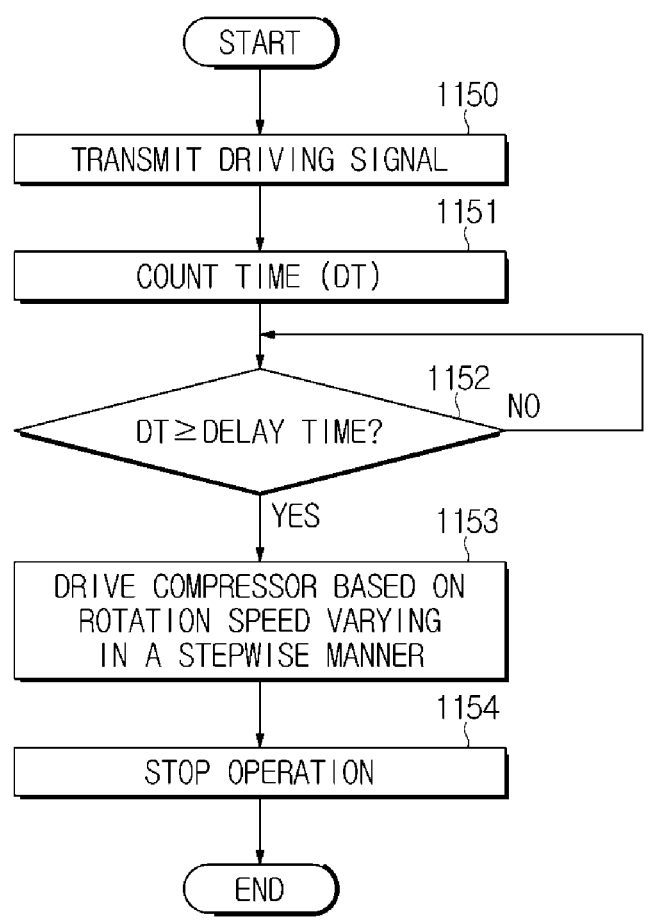
FIG. 31 is a flowchart for describing a method of controlling a refrigerator according to another embodiment.

If the average during the calculated second limit period is less than the second reference value (No of 1125), the compressor may operate at the fourth rotation speed higher than the second rotation speed and the third rotation speed (1140 of FIG. 31). The compressor of the refrigerator may continuously operate until receiving of the driving signal stops or a signal to stop driving is received (No of 1141 and 1140). If the signal to stop driving is received (Yes of 1141), the compressor may stop operation and circulation of the refrigerant may also be stopped (1142).

If the compressor operates at the third rotation speed (1130 and 1129a) as illustrated in FIGS. 28 and 29, the refrigerator starts counting of time (1131). In this case, the refrigerator may count a time by using two variables MT3 and PT3. Here, a fifth variable MT3 is a variable used to determine the elapse of the third reference period, and a sixth variable PT3 is a variable used to determine the elapse of the third limit period. The refrigerator may determine the elapse of the third reference period or the third limit period by increasing the fifth variable MT3 and the sixth variable PT3 with time.

When the compressor starts operation at the third rotation speed (1130 and 1129a), the refrigerator may store the levels of the electric signals applied to the compressor periodically or non-periodically (1132). Here, the levels of the electric signals may include a level of at least one of voltage, current, and power. The levels of the electric signals may be stored after the counting of time is started (1131) as illustrated in FIG. 30, at the same time as the counting of time (1131), or before the counting of time (1131) depending on the designer's intention.

If the third reference period is set to be shorter than the third limit period, the refrigerator compares the fifth variable MT3 with the third reference period after the storing of the levels of the electric signals is started (1133).

If the fifth variable MT3 is less than the third reference period (No of 1133), i.e., if the third reference period has not elapsed, the refrigerator continues to store the levels of the electric signals. On the contrary, if the fifth variable MT3 is the same as or greater than the third reference period (Yes of 1133), the refrigerator may calculate the third average of the levels of the electric signals stored during the third reference period (1134) and compare the calculated third average with the third reference value (1135).

If the third average is less than the third reference value as a result of the comparison (No of 1136), the compressor continues to operate at the third rotation speed (1116). In other words, the rotation speed of the compressor motor is not changed. Immediately after the third reference period or at a predetermined time after the third reference period, the fifth variable MT3 is reset and the refrigerator restarts counting of time for comparison between the fifth variable MT3 and the third reference period. Even while the calculation and comparison of the third average are performed, the counting of time is performed continuously by using the sixth variable PT3.

While the compressor operates at the third rotation speed (1136), the refrigerator may compare the sixth variable PT3 with the third limit period (1118).

In this case, if the sixth variable PT3 is less than the third limit period obtained from the storage unit (No of 1137), the refrigerator may repeat Operations 1132 to 1136 described above.

On the contrary, if the sixth variable PT3 is the same as or greater than the third limit period (Yes of 1137), the compressor of the refrigerator starts rotation at the fourth rotation speed higher than the third rotation speed (1140). In this regard, the fourth rotation speed may be the fastest rotation speed among the set rotation speeds of the motor of the compressor.

Meanwhile, as a result of comparison between the third average and the third reference value (1135), if the third average is the same as or greater than the third reference value (Yes of 1135), the motor of the compressor operates at the fourth rotation speed higher than the third rotation speed (1140).

In other words, the compressor of the refrigerator starts operation at the fourth rotation speed if the third average is greater than the third reference value or if the third limit period has elapsed since the compressor started operation at the third rotation speed.

If receiving of the driving signal from the storage compartment temperature sensing unit stops or the signal to stop operation is received from the compressor controller (1141), the compressor of the refrigerator may stop operation (1142). Accordingly, the motor of the compressor does not rotate or rotates at a very low speed. As a result, the refrigerant is not circulated or circulated very slowly in the cooling cycle.

FIG. 31 is a flowchart for describing a method of controlling a refrigerator according to another embodiment.

According to the method of controlling the refrigerator illustrated in FIG. 31, when the compressor receives a driving signal from the storage compartment temperature sensing unit such as the thermostat and/or receives a control signal from the compressor controller (1150), the refrigerator starts counting of time (1151). In this case, the refrigerator may use a seventh variable DT to count time.

The refrigerator compares the seventh variable DT with a delay time preset by the designer or the user (1152).

If the seventh variable DT is the same or greater than the delay time (Yes of 1152), the compressor of the refrigerator starts operation (1153). On the contrary, if the seventh variable DT is less than the delay time (No of 1152), the compressor of the refrigerator does not start operation. In other words, the compressor may start operation after a preset delay time upon receiving the driving signal or the control signal.

When the compressor starts operation, the compressor may operate at a rotation speed of the motor varying in a stepwise manner (1153). Since this operation has been described above with reference to FIGS. 27 to 30, detailed descriptions thereof will not be repeated.

After starting operation, the compressor stops operation if receiving the driving signal from the storage compartment temperature sensing unit stops or the signal to stop operation is received from the compressor controller (1154).

Figure 32:
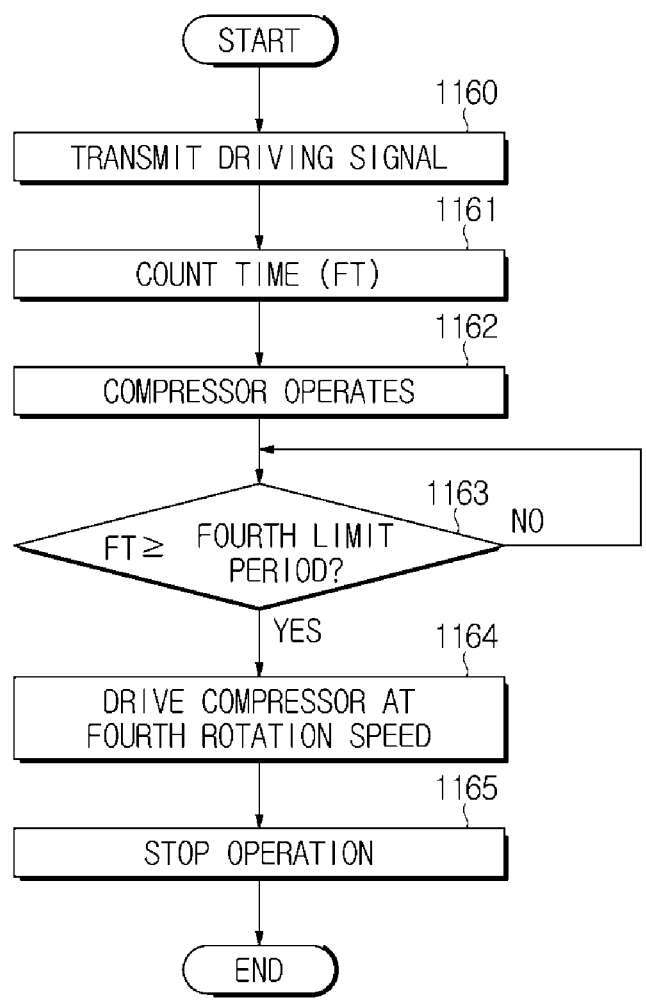
FIG. 32 is a flowchart for describing a method of controlling a refrigerator according to another embodiment.

FIG. 32 is a flowchart for describing a method of controlling a refrigerator according to another embodiment.

According to the method of controlling the refrigerator illustrated in FIG. 32, when the compressor receives a driving signal from the storage compartment temperature sensing unit and/or a control signal for operation from the compressor controller, or when a predetermined time has elapsed since a previous operation of the compressor was stopped (1160), the refrigerator may count a period of time from a time point of receiving the driving signal or a time point after the elapse of the predetermined time (1161). In this case, the refrigerator may use an eighth variable FT to count the period of time from the time point of receiving the driving signal or the time point after the elapse of the predetermined time.

The compressor starts operation upon receiving the driving signal and/or the control signal (1162). In this case, the compressor may operate at a rotation speed of the motor which is the same as in the method described above with reference to FIGS. 27 to 30 or in a partially modified manner. Operation of the compressor has been described above, and thus detailed descriptions thereof will not be repeated.

The refrigerator may increase the eighth variable FT by using a clock during operation and compare the eighth variable FT with a fourth limit period preset by the designer or the user at a given time point or at a random time point (1163). In this case, the fourth limit period may be longer than the aforementioned first to third limit periods.

If the eighth variable FT is less than the fourth limit period (No of 1163), the refrigerator does not perform operation related to the fourth limit period and continuously operates as described above.

If the eighth variable FT is the same as or greater than the fourth limit period (Yes of 1163), the compressor of the refrigerator may be controlled to operate at the fourth rotation speed (1164). In this regard, the fourth rotation speed may be the fastest rotation speed among the preset plurality of rotation speeds, e.g., the first to fourth rotation speeds.

In other words, if a given time period, i.e., the fourth limit period, has elapsed while the compressor operates at a rotation speed of the motor varying in the stepwise manner as described above, the compressor of the refrigerator operates at the fastest rotation speed regardless of the previous control. Thus, the temperature of the storage compartment may be quickly reduced without decreasing the cooling rate.

After starting operation, the compressor stops operation if receiving of the driving signal from the storage compartment temperature sensing unit stops or the signal to stop operation is received from the compressor controller as described above (1165).

FIG. 33 is a flowchart for describing a method of controlling a refrigerator according to another embodiment.

According to the method of controlling the refrigerator illustrated in FIG. 33, the refrigerator may measure temperature of the external air and determine a range of rotation speed of the compressor based on a measurement result.

Particularly, the refrigerator may measure the temperature of the external air by using an external air temperature sensing unit disposed at an outer surface of the refrigerator (1170).

The refrigerator compares the measured temperature of the external air with a first temperature separately set (1171). If the temperature of the external air is lower than the first temperature (Yes of 1171), the compressor of the refrigerator may be controlled to operate at a rotation speed lower than the preset fifth rotation speed (1172). In this case, the compressor of the refrigerator may operate at the rotation speed lower than the fifth rotation speed by determining whether the first to fourth rotation speeds stored in the storage unit are lower than the fifth rotation speed, correcting the first to fourth rotation speeds to be lower than the fifth rotation speed depending on a determination result, or controlling the rotation speed of the motor of the compressor by generating a separate control signal. The compressor may operate at a rotation speed varying in a stepwise manner as described above.

Thus, power consumption of the refrigerator may be reduced, and energy efficiency of the refrigerator may be improved.

If the temperature of the external air is higher than the first temperature (No of 1171), the refrigerator may compare the measured temperature of the external air with a second temperature separately set (1173). If the temperature of the external air is higher than the second temperature (Yes of 1173), the compressor may operate at a rotation speed higher than the separately set sixth rotation speed (1174). In this regard, the second temperature may be the same as the first temperature. If the second temperature is the same as the first temperature, Operation 1173 may be dispensed with.

If the temperature of the external air is higher than the second temperature (Yes of 1173), the refrigerator may determine whether the second to fourth rotation speeds stored in the storage unit are higher than the sixth rotation speed, and correct the second to fourth rotation speeds to be higher than the sixth rotation speed depending on the determination result. In this case, the initial rotation speed of the compressor, i.e., first rotation speed, may be set to be lower than the sixth rotation speed. In addition, as the rotation speed of the motor of the compressor is controlled by the control signal generated by the compressor controller, the compressor of the refrigerator may operate at a rotation speed higher than the sixth rotation speed. In this case, the compressor may also operate at a rotation speed varying in a stepwise manner as described above.

Meanwhile, if the compressor operates at a rotation speed higher than the sixth rotation speed and the first rotation speed is set to be lower than the sixth rotation speed, the compressor may operate at the first rotation speed only for a predetermined period of time, and accordingly power consumption of the refrigerator may be minimized. Here, the predetermined period of time may be any period of time less than 1 hour. The predetermined period of may be set by the designer or the user.

If the compressor operates at the rotation speed higher than the sixth rotation speed as described above, the refrigerator may be circulated at an appropriate speed despite an overload applied to the motor, thereby improving cooling performance of the refrigerator.

Meanwhile, if the temperature of the external air is lower than the second temperature (No of 1173), the compressor may operate based on separately defined settings. For example, the compressor may operate at any one of the first to fourth rotation speeds preset by the designer or the user regardless of the temperature of the external air (1175). If the first temperature is the same as the second temperature, Operation 1175 may be dispensed with.

As is apparent from the above description, according to the refrigerator and the method of controlling the same, the RPM of the compressor may be appropriately changed based on an input value of the electric signal.

According to the refrigerator and the method of controlling the same, the RPM of the compressor may be appropriately controlled without using a sensor configured to sense the internal temperature of the storage compartment and/or a sensor to sense temperature of external air.

According to the refrigerator and the method of controlling the same, noise caused by operation of the compressor, power consumption required for operation of the compressor, and manufacturing costs of the refrigerator may be reduced.

According to the refrigerator and the method of controlling the same, power consumption is reduced when a low load is applied and the objects may be quickly chilled or frozen when an overload is applied.

According to the refrigerator and the method of controlling the same, lifespan of the compressor may be increased by appropriately controlling the driving period of the compressor.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
a compressor configured to operate at a first rotation speed; and
a controller configured to:
start a first reference period that is a period for calculating a first average of levels of electric signals while the electric signals are being input to the compressor,
store a plurality of levels of electric signals input to the compressor during the first reference period,
calculate a first average of the plurality of levels of electric signals input to the compressor, and
control the compressor to operate at a second rotation speed higher than the first rotation speed when the first average is greater than a first reference value of electric signals.

2. The refrigerator according to claim 1, wherein the controller is further configured to control the compressor to continuously operate at the first rotation speed when the first average is less than the first reference value.

3. The refrigerator according to claim 1, wherein the controller is further configured to control the compressor to operate at a third rotation speed higher than the second rotation speed when the compressor rotates at the first rotation speed for a first limit period or longer.

4. The refrigerator according to claim 1, wherein the controller is further configured to:
calculate a second average of levels of electric signals input to the compressor during a second reference period after the compressor starts operation at the second rotation speed, and
control the compressor to operate at a third rotation speed higher than the second rotation speed when the second average is greater than a second reference value of electric signals.

5. The refrigerator according to claim 4, wherein the controller is further configured to control the compressor to operate at a fourth rotation speed higher than the second rotation speed when the compressor rotates at the second rotation speed for a second limit period or longer.

6. The refrigerator according to claim 5, wherein the second limit period is shorter than the second reference period.

7. The refrigerator according to claim 6, wherein the controller is further configured to:
calculate an average of levels of the electric signals input during the second limit period,
calculate a second average of levels of the electric signals input during the second reference period when the average during the second limit period is greater than the second reference value, and
control the compressor to operate at the third rotation speed higher than the second rotation speed when the second average is greater than the second reference value.

8. The refrigerator according to claim 7, wherein the controller is further configured to control the compressor to operate at the fourth rotation speed higher than the second and third rotation speeds when the average during the second limit period is less than the second reference value.

9. The refrigerator according to claim 7, wherein the controller is further configured to control the compressor to operate at the second rotation speed when the second average is less than the second reference value.

10. The refrigerator according to claim 4, wherein the controller is further configured to:
calculate a third average of levels of the electric signals input to the compressor during a third reference period after the compressor starts operation at the third rotation speed, and
control the compressor to operate at a fourth rotation speed higher than the third rotation speed when the third average is greater than a third reference value.

11. The refrigerator according to claim 10, wherein the controller is further configured to:
control the compressor to operate at the fourth rotation speed higher than the third rotation speed when the third average is less than the third reference value and the compressor operates at the third rotation speed for a third limit period or longer.

12. The refrigerator according to claim 10, wherein the controller is further configured to control the compressor to operate at the fourth rotation speed when the compressor operates for a fourth limit period or longer after the compressor starts operation.

13. The refrigerator according to claim 10, wherein at least two of the first reference period, the second reference period, and the third reference period are different.

14. The refrigerator according to claim 10, wherein the second reference value is greater than the first reference value, and the third reference value is greater than the second reference value.

15. A method of controlling a refrigerator, the method comprising:
driving a compressor at a first rotation speed;
starting a first reference period that is a period for calculating a first average of levels of electric signals while the electric signals are being input to the compressor;
storing a plurality of levels of electric signals input to the compressor during the first reference period;
calculating a first average of the plurality of levels of electric signals input to the compressor; and
driving the compressor at a second rotation speed higher than the first rotation speed when the first average is greater than a first reference value of electric signals.

* * * * *